US012586496B2

(12) United States Patent
Park et al.

(10) Patent No.: US 12,586,496 B2

(45) Date of Patent: Mar. 24, 2026

(54) DISPLAY DEVICE AND METHOD OF DRIVING A DISPLAY DEVICE

(71) Applicants: Samsung Display Co., LTD., Yongin-si (KR); UNIST(ULSAN NATIONAL INSTITUTE OF SCIENCE AND TECHNOLOGY), Ulsan (KR)

(72) Inventors: Kyeongmin Park, Yongin-si (KR); Franklin Don Bien, Ulsan (KR); Kyeonghan Shin, Ulsan (KR); Seunghun Oh, Ulsan (KR); Haewan Cho, Ulsan (KR); Dongjin Choi, Ulsan (KR)

(73) Assignees: SAMSUNG DISPLAY CO., LTD., Gyeonggi-Do (KR); UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 18/959,606

(22) Filed: Nov. 26, 2024

(65) Prior Publication Data

US 2025/0174165 A1 May 29, 2025

(30) Foreign Application Priority Data

Nov. 28, 2023 (KR) ........................ 10-2023-0168705

(51) Int. Cl.

*G09G 3/3291* (2016.01)

*G09G 3/00* (2006.01)

(Continued)

(52) U.S. Cl.

CPC ........... *G09G 3/006* (2013.01); *G09G 3/2092* (2013.01); *G09G 3/3233* (2013.01);

(Continued)

(58) Field of Classification Search

CPC .... G09G 3/006; G09G 3/2092; G09G 3/3233; G09G 2300/0842; G09G 2310/08;

(Continued)

(56) References Cited

U.S. PATENT DOCUMENTS 8,558,825 B2 10/2013 Kim et al.
10,319,307 B2 6/2019 Chaji et al.

(Continued)

OTHER PUBLICATIONS

Hong et al., "A Brief History of OLEDs Emitter Development and Industry Milestones," Advanced Materials, 2021, 24 pages.

(Continued)

*Primary Examiner* — Abdul-Samad A Adediran

(74) *Attorney, Agent, or Firm* — CANTOR COLBURN LLP

(57) ABSTRACT

A display device includes a display panel including an active pixel and a reference pixel, a reference pixel measurer which applies a reference data voltage and a gate voltage to the reference pixel, calculates a first threshold voltage and a second threshold voltage based on a driving current of the reference pixel and calculates a difference between the first threshold voltage and the second threshold voltage, and a driving controller which controls the reference pixel measurer and outputs a data signal based on the difference.

23 Claims, 20 Drawing Sheets

(51) Int. Cl.
*G09G 3/20* (2006.01)
*G09G 3/3233* (2016.01)

(52) U.S. Cl.
CPC ............... *G09G 2300/0842* (2013.01); *G09G 2310/08* (2013.01); *G09G 2320/0233* (2013.01); *G09G 2320/0242* (2013.01); *G09G 2330/12* (2013.01)

(58) Field of Classification Search
CPC .............. G09G 2320/0233; G09G 2320/0242; G09G 2330/12; H10K 59/131
See application file for complete search history.

(56) References Cited

U.S. PATENT DOCUMENTS

| | | | | |
|---|---|---|---|---|
| 10,360,827 | B2 | 7/2019 | Bi et al. | |
| 2017/0103703 | A1 | 4/2017 | Bi et al. | |
| 2018/0075798 | A1 | 3/2018 | Nho et al. | |
| 2019/0221146 | A1 | 7/2019 | Lin et al. | |
| 2020/0020277 | A1* | 1/2020 | Lee | H10K 59/131 |
| 2020/0166644 | A1 | 5/2020 | Lin et al. | |
| 2022/0148517 | A1* | 5/2022 | Kim | G09G 3/3233 |

OTHER PUBLICATIONS

Park et al., “Real-Time External Compensation System With Error Correction Algorithm for High-Resolution Mobile Displays,” IEEE Transactions on Circuits and Systems—I: Regular Papers, vol. 70, No. 3, Mar. 2023, 12 pages.

Nack-Hyeon Keum et al, “An AMOLED Pixel Circuit With a Compensating Scheme for Variations in Subthreshold Slope and Threshold Voltage of Driving TFTs,” IEEE Journal of Solid-State Circuits, Nov. 2020, pp. 3087-3096, vol. 55, No. 11.

Joon Ho Lee et a., “Correlation between the compensation time and the current deviation of organic LED pixel circuit,” Wiley, J Soc Inf Display, 2020, 10 pages.

Lynn Verschueren et al., “External compensation for high-resolution active matrix organic light-emitting diode displays,” Wiley, J Soc Inf Display, 2021, pp. 511-525.

Zhang et al., “New external compensation schemes for AMOLED,” International Conference on Display Technology, 2020, pp. 378-381, vol. 52.

* cited by examiner

DISPLAY DEVICE AND METHOD OF DRIVING A DISPLAY DEVICE

This application claims priority to Korean Patent Application No. 10-2023-0168705, filed on Nov. 28, 2023, and all the benefits accruing therefrom under 35 U.S.C. § 119, the content of which in its entirety is herein incorporated by reference.

BACKGROUND

1. Field

Embodiments of the invention relate to a display device and a method of driving the display device. More particularly, embodiments of the invention relate to a display device and a method of driving the display device for performing a sensing operation and a compensation operation.

2. Description of the Related Art

Generally, a display device includes a display panel and a display panel driver. The display panel may include a plurality of gate lines, a plurality of data lines and a plurality of pixels. The display panel driver may include a gate driver for providing a gate signal to the gate lines, a data driver for providing a data voltage to the data lines and a driving controller for controlling the gate driver and the data driver.

SUMMARY

Generally, in a display device, where pixels are manufactured by a same process, driving switching elements of the pixels may have different driving characteristics (e.g., mobility and/or threshold voltage) from each other. Accordingly, in such a display device, the pixels may emit light at different luminance even based on a same data voltage applied thereto. Additionally, a compensation voltage that reflects the driving characteristics of the pixels may have low reliability.

Embodiments of the invention provide a display device that provides an improved compensation voltage by generating an error function from a reference pixel.

Embodiments of the invention also provide a method of driving the display device.

In an embodiment of a display device according to the invention, the display device includes a display panel, a reference pixel measurer and a driving controller. In such an embodiment, the display panel includes an active pixel and a reference pixel. In such an embodiment, the reference pixel measurer applies a reference data voltage and a gate voltage to the reference pixel, calculates a first threshold voltage and a second threshold voltage based on a driving current of the reference pixel corresponding to the reference data voltage and calculates a difference between the first threshold voltage and the second threshold voltage. In such an embodiment, the driving controller controls the reference pixel measurer and to output a data signal based on the difference between the first threshold voltage and the second threshold voltage. In such an embodiment, the reference pixel includes a reference driving transistor including a first control electrode which receives the reference data voltage, a second control electrode which receives the gate voltage, a first electrode which receives a first power voltage and a second electrode connected to a second reference node. In such an embodiment, the active pixel includes an active driving transistor including a first control electrode connected to a first active node, a first electrode which receives the first power voltage and a second electrode connected to a second active node, an active scan transistor including a control electrode which receives a scan gate signal, a first electrode which receives a data voltage based on the data signal and a second electrode connected to the first active node, an active sensing transistor including a control electrode which receives a sensing gate signal, a first electrode connected to a sensing line and a second electrode connected to the second active node and a light emitting element including an anode connected to the second active node and a cathode which receives a second power voltage.

In an embodiment, the gate voltage may be varied.

In an embodiment, the gate voltage may include first to K-th gate voltages, where K may be a positive integer. In such an embodiment, the reference data voltage may include a first reference data voltage to a second reference data voltage. In such an embodiment, the reference pixel measurer may calculate a voltage-current curve function by applying the first reference data voltage to the second reference data voltage to the first control electrode of the reference driving transistor, calculate an error value based on the voltage-current curve function, calculate a first to a K-th error values corresponding to the first to the K-th gate voltages, respectively, and generate an error function based on the first to the K-th error values.

In an embodiment, the error value may be a value obtained by subtracting the second threshold voltage calculated by applying the second equation to the voltage-current curve function from the first threshold voltage calculated by applying the first equation to the voltage-current curve function.

In an embodiment, the first threshold voltage may be calculated by using the first equation, the first equation may be a $$\mathrm{V}TH = \max\left\{\frac{d}{d\mathrm{V}GS}\left(\frac{d}{d\mathrm{V}GS}f^{0.5}(\mathrm{V}GS)\right)\right\},$$

where VTH denotes the first threshold voltage, $f^{0.5}$(VGS) denotes a 0.5 square curve function obtained by multiplying the voltage-current curve function to the power of 0.5, and the $$\max\left\{\frac{d}{d\mathrm{V}GS}\left(\frac{d}{d\mathrm{V}GS}f^{0.5}(\mathrm{V}GS)\right)\right\},$$

corresponds to a maximum value of values obtained by second differentiation of the 0.5 square curve function.

In an embodiment, the second threshold voltage may be calculated by using the second equation. In such an embodiment, the second equation may be a $$\mathrm{VTH\_CAL} = \frac{\sqrt{I2} * \mathrm{V}GS1 - \sqrt{I1} * \mathrm{V}GS2}{\sqrt{I2} - \sqrt{I1}},$$

where VTH_CAL denote the second threshold voltage, VGS1 denotes a voltage difference between a first control electrode and the second electrode of the reference driving transistor when a first sensing data voltage between the first reference data voltage to the second reference data voltage is applied to the first control electrode of the reference driving transistor, VGS2 denotes a voltage difference between the first control electrode and the second electrode of the reference driving transistor when a second sensing data voltage between the first reference data voltage to the second reference data voltage is applied to the first control electrode of the reference driving transistor, I1 denotes a first driving current corresponding to the first sensing data voltage, and I2 denotes a second driving current corresponding to the second sensing data voltage.

In an embodiment, the driving controller may receive the error function, store the error function and output the data signal based on the error function.

In an embodiment, the display device may further include a data driver which applies the data voltage to the active pixels in an active period and a sensing driver which receives a sensing current from at least one pixel of the active pixels in a blank period and outputs a sensing data including a sensing threshold voltage. In such an embodiment, the timing controller may control the data driver and the sensing driver. In such an embodiment, the driving controller may include a compensation voltage calculator and a data signal outputter. In such an embodiment, the compensation voltage calculator may receive the sensing data, calculate an active threshold voltage based on the sensing threshold voltage, calculate a compensation voltage based on the active threshold voltage and the error function and output the data signal based on the compensation voltage. In such an embodiment, the compensation voltage calculator may receive the sensing data, calculate an active threshold voltage based on the sensing threshold voltage, calculate a compensation voltage based on the active threshold voltage and the error function and output the data signal based on the compensation voltage.

In an embodiment, the active threshold voltage may be calculated by using a third equation. In such an embodiment, the third equation may be a $$\text{PXA\_VTH\_CAL} = \frac{\sqrt{VSEN2} * VGS1A - \sqrt{VSEN1} * VGS2A}{\sqrt{VSEN2} - \sqrt{VSEN1}},$$

where PXA_VTH_CAL denotes the active threshold voltage, VGS1A denotes a voltage difference between the first control electrode and the second electrode of the active driving transistor of the least one pixel when a first active sensing data voltage included in the data voltage is applied to the first control electrode of the active driving transistor, VGS2A denotes a voltage difference between the first control electrode and the second electrode of the active driving transistor of the least one pixel when a second active sensing data voltage included in the data voltage is applied to the first control electrode of the active driving transistor, VSEN1 denotes a first sensing threshold voltage corresponding to the first active sensing data voltage, and VSEN2 denotes a second sensing threshold voltage corresponding to the second active sensing data voltage.

In an embodiment, the display panel may further include first to fourth sensing lines. In such an embodiment, the sensing driver may include an odd numbered sensing circuit and an even numbered sensing circuit. In such an embodiment, the odd numbered sensing circuit may be connected to the first sensing line and the third sensing line. In such an embodiment, the even numbered sensing circuit may be connected to the second sensing line and the fourth sensing line.

In an embodiment, the compensation voltage may be an average value of a first compensation voltage calculated in a first frame and a second compensation voltage calculated in a second frame.

In an embodiment, the error function may include a red error function corresponding to a red reference light emitting element, a green error function corresponding to a green reference light emitting element and a blue error function corresponding to a blue reference light emitting element.

In an embodiment, the error function may be generated in the manufacturing process.

In an embodiment of a method of driving a display device according to the invention, the method includes storing a first sensing threshold voltage outputted by applying a first sensing data voltage to a first control electrode of an active driving transistor included in an active pixel, storing a second sensing threshold voltage outputted by applying a second sensing data voltage to a first control electrode of an active driving transistor included in an active pixel after the storing the first sensing threshold voltage, calculating an active threshold voltage based on the first sensing threshold voltage and the second sensing threshold voltage and outputting a compensation voltage calculated by using an error value which is a difference between a first threshold voltage and a second threshold voltage obtained from a reference pixel and the active threshold voltage after the calculating the active threshold voltage.

In an embodiment, of the method may further include calculating the error value including applying a first reference data voltage to a second reference data voltage to a first control electrode of a reference driving transistor of the reference pixel and applying a gate voltage to a second control electrode of the reference driving transistor, calculating a voltage-current curve function of the reference driving transistor after the applying the first reference data voltage to the second reference data voltage and the gate voltage, calculating the first threshold voltage and the second threshold voltage based on voltage-current curve function after the calculating the voltage-current curve function, storing the error value obtained by subtracting the second threshold voltage from the first threshold voltage after the calculating the first threshold voltage and the second threshold voltage storing the error value obtained by subtracting the second threshold voltage from the first threshold voltage and calculating a first error value to a K-th error value by changing the gate voltage K times after storing the error value after the storing the error value, where K may be a positive integer.

In an embodiment, the method may further include generating an error function based on the first error value to the K-th error value.

In an embodiment, the first threshold voltage may be calculated by using the first equation. In such an embodiment, the first equation may be a $$VTH = \max\left\{\frac{d}{dVGS}\left(\frac{d}{dVGS}f^{0.5}(VGS)\right)\right\},$$

where VTH denotes the first threshold voltage, $f^{0.5}(VGS)$ denotes a 0.5 square curve function obtained by multiplying the voltage-current curve function to the power of 0.5, and $$\max\left\{\frac{d}{dVGS}\left(\frac{d}{dVGS}f^{0.5}(VGS)\right)\right\}$$

corresponds to a maximum value of values obtained by second differentiation of the 0.5 square curve function.

In an embodiment, the second threshold voltage may be calculated by using the second equation. In such an embodiment, the second equation may be a $$\mathrm{VTH\_CAL} = \frac{\sqrt{I2} * VGS1 - \sqrt{I1} * VGS2}{\sqrt{I2} - \sqrt{I1}},$$

where VTH_CAL denotes the second threshold voltage, VGS1 denotes a voltage difference between a first control electrode and a source electrode of the reference driving transistor when a first sensing data voltage between the first reference data voltage to the second reference data voltage is applied to the first control electrode of the reference driving transistor, VGS2 denotes a voltage difference between a first control electrode and a source electrode of the reference driving transistor when a second sensing data voltage between the first reference data voltage to the second reference data voltage is applied to the first control electrode of the reference driving transistor, I1 denotes a first driving current corresponding to the first sensing data voltage, and I2 denotes a second driving current corresponding to the second sensing data voltage.

In an embodiment, the active threshold voltage may be calculated by using a third equation. In such an embodiment, the third equation may be a $$\mathrm{PXA\_VTH\_CAL} = \frac{\sqrt{VSEN2} * VGS1A - \sqrt{VSEN1} * VGS2A}{\sqrt{VSEN2} - \sqrt{VSEN1}},$$

where PXA_VTH_CAL denotes the active threshold voltage, VGS1A denotes a voltage difference between a first control electrode and a source electrode of the active driving transistor of the active pixel when a first active sensing data voltage included in the data voltage is applied to the first control electrode of the active driving transistor, VGS2A denotes a voltage difference between the first control electrode and the source electrode of the active driving transistor of the active pixel when a second active sensing data voltage included in the data voltage is applied to the first control electrode of the active driving transistor, VSEN1 denotes a first sensing threshold voltage corresponding to the first active sensing data voltage, and VSEN2 denotes a second sensing threshold voltage corresponding to the second active sensing data voltage.

In an embodiment, the compensation voltage may be an average value of a first compensation voltage calculated in a first frame and a second compensation voltage calculated in a second frame.

In an embodiment of a display device according to the invention, the display device includes a display panel and a display panel driver. In such an embodiment, the display panel driver drives the display panel. In such an embodiment, the display panel driver applies a compensation voltage to the display panel by using a sensing data and an error function. In such an embodiment, the display panel emits light based on the compensation voltage. In such an embodiment, the error function may be set based on first threshold voltages calculated by using a second process to voltage-current curve functions obtained by applying a first process and second threshold voltages calculated by applying a third process different from the second process to the voltage-current curve functions.

In an embodiment, the error function may be set based on an error value which is a difference between the first threshold voltage and the second threshold voltage.

In an embodiment, in the blank period, the compensation voltage may be applied to the display panel by using the sensing data and the error function.

According to embodiments of the display device and the method of driving the display device, the display device includes an active pixel, a reference pixel and a reference pixel measurer. In such embodiments, a reference driving transistor of the reference pixel may have a double-gate structure. In such embodiments, the reference pixel measurer generates an error function by changing a gate voltage applied to a second control electrode of the reference driving transistor such that an accuracy of the compensation data (e.g., a threshold voltage of an active driving transistor and/or a mobility of the active driving transistor) of active pixels may be improved through the error function.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
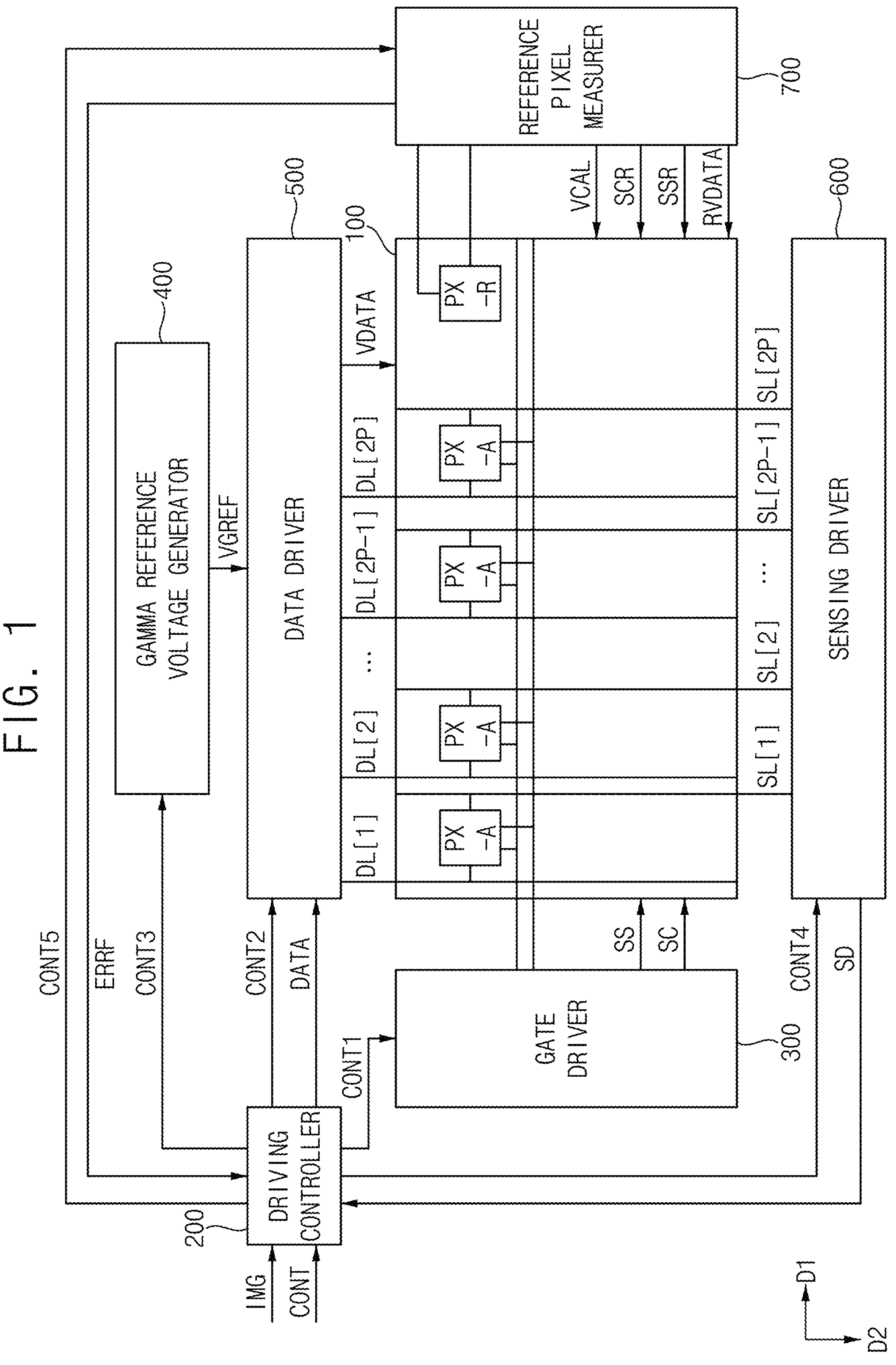
FIG. 1 is a block diagram illustrating a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a" "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be explained in detail with reference to the accompanying drawings.

FIG. 1 is a block diagram illustrating a display device according to an embodiment of the invention.

Referring to FIG. 1, an embodiment of the display device may include a display panel 100 including an active pixel PX-A and a reference pixel PX-R and a panel driver for driving the display panel 100. In an embodiment, the panel driver 110 may include a gate driver 300 configured to provide a scan gate signal SC and a sensing gate signal SS to the active pixel PX-A, a gamma reference voltage generator 400 configured to provide a gamma reference voltage VGREF to a data driver, the data driver 500 connected to the active pixel PX-A through data lines DL[1], DL[2], DL[3], . . . , DL[2P−1] and DL[2P](Herein, the P is a positive integer), sensing driver 600 connected to the active pixel PX-A through sensing lines SL[1], SL[2], SL[3], . . . , SL[2P−1] and SL[2P], a reference pixel measurer 700 configured to provide a reference data voltage RVDATA, a gate voltage VCAL, a reference scan gate signal SCR and a reference sensing gate signal SSR to the reference pixel PX-R and a driving controller 200 configured to control the gate driver 300, the gamma reference voltage generator 400, the data driver 500, the sensing driver 600 and the reference pixel measurer 700. In an embodiment, the gate voltage VCAL may be a direct current (DC) voltage. In an embodiment, the gate voltage VCAL may be changed or varies.

The display panel 100 may include the data lines DL[1], DL[2], DL[3], . . . , DL[2P−1] and DL[2P], the sensing lines SL[1], SL[2], SL[3], . . . , SL[2P−1] and SL[2P], the reference pixel PX-R and the active pixel PX-A connected to the data lines DL[1], DL[2], DL[3], . . . , DL[2P−1] and DL[2P] and the sensing lines SL[1], SL[2], SL[3], . . . , SL[2P−1] and SL[2P]. Additionally, the display panel 100 may include a scan line for providing the scan gate signal SC to the active pixel PX-A and a sensing gate line for providing the sensing gate signal SS to the active pixel PX-A. In an embodiment, for example, the display panel 100 may be an organic light emitting diode (OLED) display panel or a quantum dot (QD) display panel, but the invention is not limited thereto.

The display device may include the display panel 100, the driving controller 200, the gate driver 300, the gamma reference voltage generator 400, the data driver 500, the sensing driver 600 and the reference pixel measurer 700. In an embodiment, the driving controller 200, the gamma reference voltage generator 400, the data driver 500, the sensing driver 600 and the reference pixel measurer 700 may be integrally formed as (or integrated into) a single chip. In an embodiment, for example, the driving controller 200 and the reference pixel measurer 700 may be integrally formed as a single chip.

The display panel 100 may have a display region on which an image is displayed and a peripheral region adjacent to the display region. No image may be displayed on the peripheral region, that is, no pixel may be disposed in the peripheral region. In an embodiment, the gate driver 300 may be disposed in the peripheral region. In an embodiment, the gate driver 300 may be integrated (or integrally formed) in the peripheral region.

The driving controller 200 may receive input image data IMG and an input control signal CONT from a host processor (e.g. an application processor, a graphic processing unit, etc.). In an embodiment, for example, the input image data IMG may include red image data, green image data and blue image data. In an embodiment, for example, the input image data IMG may include white image data. In another embodiment, for example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4, a fifth control signal CONT5 and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a scan clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The gate driver 300 may generate the scan gate signals SC for driving the scan lines and the sensing gate signals SS for driving the sensing lines in response to the first control signal CONT1 received from the driving controller 200. The gate driver 300 may output the scan gate signals SC to the scan lines. The gate driver 300 may output the sensing gate signals SS to the sensing gate lines.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to each of the data signal DATA.

In an embodiment, for example, the gamma reference voltage generator 400 may be disposed in the driving controller 200 or in the data driver 500.

The data driver 500 may receive the second control signal CONT2 and the data signal DATA from the driving controller 200. The data driver 500 may convert the data signal DATA into data voltages VDATA having an analog type. The data voltage VDATA may include a first active sensing data voltage and a second active sensing data voltage. The data driver 500 may output the data voltages VDATA to the data lines DL[1], DL[2], DL[3], . . . , DL[2P−1] and DL[2P].

In an embodiment, the data driver 500 may be implemented with one or more integrated circuits. In another embodiment, the data driver 500 and the driving controller 200 may be implemented as a single integrated circuit and the single integrated circuit may be referred to as a timing controller embedded data driver (TED).

The sensing driver 600 may receive the fourth control signal CONT4 from the driving controller 200. The sensing driver 600 may generate sensing data SD by sensing the active pixel PX-A through the sensing lines SL[1], SL[2], SL[3], . . . , SL[2P−1] and SL[2P]. In an embodiment, for example, in a blank period (or a vertical blank period (V-blank period in FIG. 4)), the sensing driver 600 may sense at least one pixel of the active pixels PX-A. In an embodiment, for example, the sensing driver 600 may sense a driving characteristic (e.g., a mobility and/or a threshold voltage) of an active driving transistor of the active pixel PX-A by measuring a sensing current (or a sensing voltage) of the active driving transistor of the least one pixel through the sensing line SL[1], SL[2], SL[3], . . . , SL[2P−1] and SL[2P]. In an embodiment, for example, an operation of sensing the driving characteristic (e.g., a mobility and/or a threshold voltage) of the driving transistor may be referred to as a sensing operation. In an embodiment, the sensing driver 600 may be implemented with a separate integrated circuit from an integrated circuit of the data driver 500. In other embodiments, the sensing driver 600 may be included in the data driver 500 or may be included in the driving controller 200.

The reference pixel generator 700 may receive the fifth control signal CONT5 from the driving controller 200. The reference pixel generator 700 may provide the reference data voltage RVDATA, the gate voltage VCAL, the reference scan gate signal SCR and the reference sensing gate signal SSR to the reference pixel PX-R. In an embodiment, the reference pixel measurer 700 may be included in the data driver 500, the sensing driver 600 or the driving controller 200. In an embodiment, the reference pixel generator 700, the data driver 500 and the driving controller 200 may be implemented as a single integrated circuit. In an embodiment, the reference pixel PX-R may receive the reference data voltage RVDATA from the data driver 500, may receive the gate voltage VCAL, the reference scan gate signal SCR and the reference sensing gate signal SSR from the sensing driver 600 and may apply a reference sensing data RSD of FIG. 2 to the driving controller 200 by being connected to the sensing driver 600. The reference sensing data may have a data of a driving characteristic (e.g., a mobility and/or a threshold voltage) of a reference driving transistor TDRR of FIG. 3. In an embodiment, the reference pixel PX-A may be chosen from among the active pixels PX-A.

In a conventional display device, when performing the sensing operation, a threshold voltage of a driving transistor may be derived based on a first conventional data voltage and a second conventional data voltage. For example, such a conventional threshold voltage deriving method may refer to as a two-point sensing method. Accordingly, an accuracy of the threshold voltage of the driving transistor may not be substantially high. Additionally, a driving transistor of the conventional display device may be driven in a subthreshold region for reducing a power consumption. Accordingly, a sensing data of the conventional display device may be inaccurate and an accuracy of a compensation voltage may not be substantially high.

In an embodiment of the display device according to the invention, a sensing accuracy of the active driving transistor may be improved through the sensing operation and compensation voltage, which will hereinafter be described with FIGS. 2 to 22.

Figure 2:
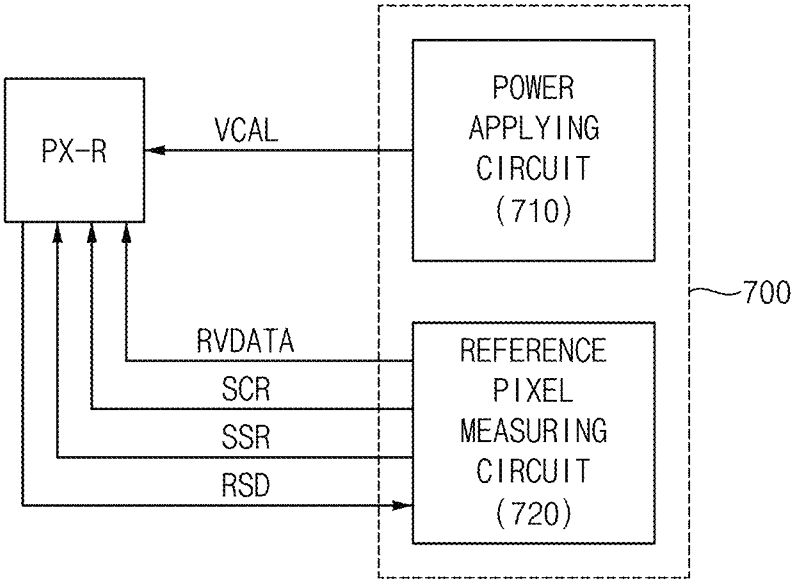
FIG. 2 is a block diagram illustrating a reference pixel and a reference pixel measurer of FIG. 1.

FIG. 2 is a block diagram illustrating a reference pixel and a reference pixel measurer of FIG. 1.

Referring to FIG. 2, in an embodiment, the reference pixel measurer 700 may include a power applying circuit 710 and a reference pixel measuring circuit 720. The power applying circuit 710 may apply the gate voltage VCAL to the reference pixel PX-R. The reference pixel measuring circuit 720 may apply the reference data voltage RVDATA, the reference scan gate signal SCR and the reference sensing gate signal SSR. The reference pixel measuring circuit 720 may receive the reference sensing data RSD from the reference pixel PX-R. The reference sensing data RSD may have a data of a driving characteristic (e.g., a mobility and/or a threshold voltage) of a reference driving transistor TDRR of FIG. 3

Figure 3:
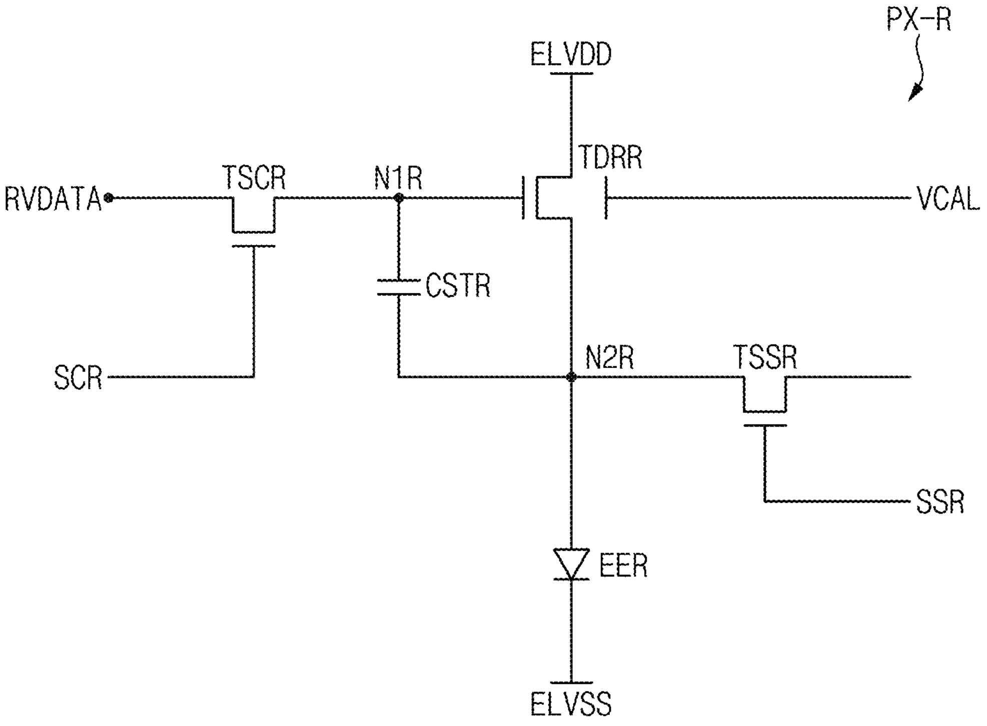
FIG. 3 is a circuit diagram illustrating a reference pixel of a display panel of FIG. 1.
Figure 4:
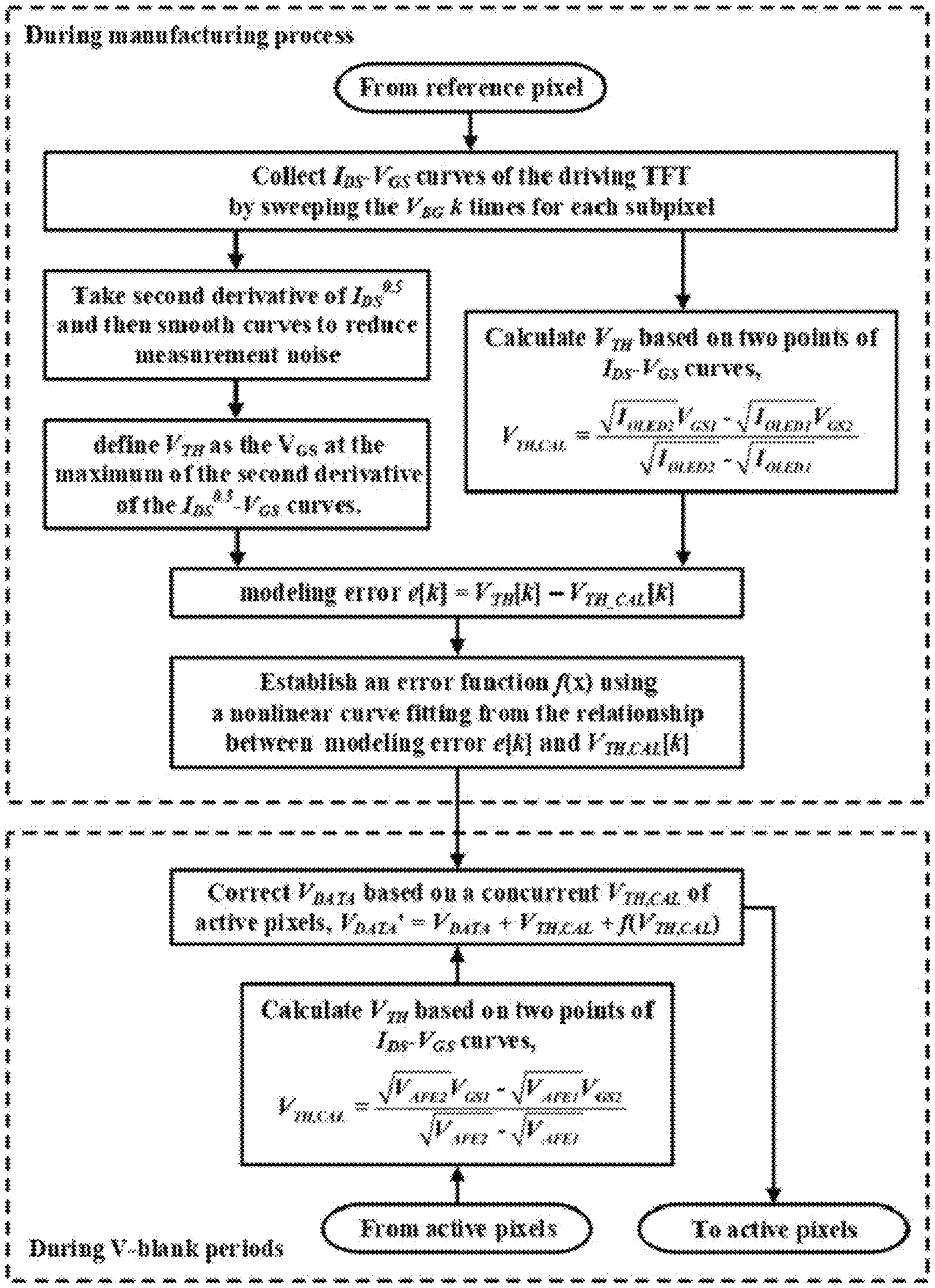
FIG. 4 is a flowchart illustrating a compensation method of a display device of FIG. 1.

FIG. 3 is a circuit diagram illustrating a reference pixel of a display panel of FIG. 1. FIG. 4 is a flowchart illustrating a compensation method of a display device of FIG. 1.

Referring to FIG. 1 to FIG. 4, in an embodiment, the reference pixel PX-R may include the reference driving transistor TDRR, a reference scan transistor TSCR, a reference sensing transistor TSSR, a reference storage capacitor CSTR and a reference light emitting element EER. In an embodiment, for example, the reference pixel PX-R may have a three transistor-one capacitor (3T-1C) structure, as shown in FIG. 3. Additionally, FIG. 3 illustrates an embodiment where transistors of the reference pixel PX-R are N-type transistors, but the invention is not limited thereto. In an embodiment, for example, the transistors included in the reference pixel PX-R may be a P-type transistor.

The reference driving transistor TDRR may have a first control electrode connected to a first reference node N1R, a second control electrode that receives the gate voltage VCAL, a first electrode that receives a first power voltage ELVDD and a second electrode connected to a second reference node N2R. In an embodiment, the reference driving transistor TDRR may have a double-gate structure. In an embodiment, the reference driving transistor TDRR may generate a driving current based on a voltage of the first reference node N1R.

In an embodiment, the gate voltage VCAL may be changed or varied. In an embodiment, for example, the gate voltage VCAL may be changed K times (Herein, K is a positive integer.). In an embodiment, when the gate voltage VCAL is changed K times, the gate voltage VCAL may be decreased sequentially. Additionally, in an embodiment, when the gate voltage VCAL is changed K times, the gate voltage VCAL may be increased sequentially.

The gate voltage VCAL is changed K times, such that the gate voltage VCAL may include first to K-th gate voltages. Additionally, an N-th gate voltage may be included in a voltage range of first to K-th gate voltages. Herein, N is a positive integer less than K.

The reference scan transistor TSCR may include a control electrode that receives the reference scan gate signal SCR, a first electrode that receives the reference data voltage RVDATA and a second electrode connected to the first reference node N1R. The reference scan transistor TSCR may apply the reference data voltage RVDATA to the first reference node N1R in response to the reference scan gate signal SCR.

The reference sensing transistor TSSR may include a control electrode that receives the reference sensing gate signal SSR, a first electrode connected to the second reference node N2R and a second electrode connected to the reference pixel measurer 700. The reference sensing transistor TSSR may apply the driving current to the reference pixel measurer 700 in response to the reference sensing gate signal SSR.

The reference storage capacitor CSTR may include a first electrode connected to the first reference node N1R and a second electrode connected to the second reference node N2R.

The reference light emitting element EER may include an anode connected to the second reference node N2R and a cathode that receives a second power voltage ELVSS.

A plurality of voltage-current curve functions may be collected or generated by changing (or sweeping) the gate voltage VCAL (VBG in FIG. 4) applied to the second control electrode of the reference driving transistor TDRR by K times. In an embodiment, the process of collecting the voltage-current curve functions by changing the gate voltage VCAL K times may be referred as a first process. A first threshold voltage VTH may be determined based on the voltage-current curve function. In an embodiment, a process of determining the first threshold voltage VTH based on the voltage-current curve function may be referred to as a second process. In an embodiment, the first threshold voltage VTH may be determined by using a first equation as shown in the FIG. 4, but the invention is not limited thereto. A second threshold voltage VTH_CAL may be determined based on the voltage-current curve function. In an embodiment, a process of determining the second threshold voltage VTH_CAL based on the voltage-current curve function may be referred to as a third process. In an embodiment, the second threshold voltage VTH_CAL may be determined by using a second equation as shown in the FIG. 4, buy the invention is not limited thereto. An error value ERR may be determined by using the first threshold voltage VTH and the second threshold voltage VTH_CAL. The gate voltage VCAL may be changed K times, such that first to K-th error values may be determined. An error function ERRF may be determined based on the second threshold voltage VTH_CAL and the error values ERR. In an embodiment, the error function ERRF may have a look-up table format, but the invention is not limited thereto. In an embodiment, the error function ERRF may be stored. In an embodiment, the error function ERRF may be stored in the display device. In a blank period of a frame period, an active threshold voltage PXA_VTH_CAL may be determined. In an embodiment, the active threshold voltage PXA_VTH_CAL may be determined by using a third equation as shown in the FIG. 4, but the invention is not limited thereto. A compensation voltage VC may be determined based on the error function ERRF and the active threshold voltage PXA_VTH_CAL.

In an embodiment, for storing the error function ERRF, the gate voltage VCAL is applied to the second control electrode of the reference driving transistor TDRR. The reference data voltage RVDATA may include a first reference data voltage to a second reference data voltage. The first reference data voltage to the second reference data voltage may be applied to the first control electrode of the reference driving transistor TDRR. In an embodiment, for example, the first reference data voltage and the second reference data voltage is set by user. In an embodiment, for example, the first reference data voltage may be a voltage corresponding to a low grayscale, and the second reference data voltage may be a voltage corresponding to a high grayscale, but the invention is not limited thereto.

The reference pixel measurer 700 may calculate the driving current corresponding to the first reference data voltage to the second reference data voltage of the reference driving transistor TDRR as a curve function. In an embodiment, for example, the voltage-current curve function may refer to as a function corresponding to IDS-VGS graph. Here, IDS may denote the driving current of the reference pixel PX-R, and VGS may denote a voltage difference between the first control electrode of the reference driving transistor and a source electrode of the reference driving transistor (e.g., the second electrode of the reference driving transistor).

The reference pixel measurer 700 may calculate the first threshold voltage VTH and the second threshold voltage VTH_CAL based on the voltage-current curve function.

In an embodiment, the first threshold voltage VTH may be calculated by using the first equation. The first equation is as follows.

$$VTH = \max\left\{\frac{d}{dVGS}\left(\frac{d}{dVGS}f^{0.5}(VGS)\right)\right\} \quad \text{[First Equation]}$$

In the first equation, VTH denotes the first threshold voltage, the $f^{0.5}$(VGS) is a 0.5 square curve function obtained by multiplying the voltage-current curve function to the power of 0.5, and the $$\max\left\{\frac{d}{dVGS}\left(\frac{d}{dVGS}f^{0.5}(VGS)\right)\right\}$$

may correspond to a maximum value obtained by second differentiation of the 0.5 square curve function. For example, the first threshold voltage VTH may correspond to a voltage corresponding to the maximum value of the second differentiation of the 0.5 power curve function obtained by raising the IDS value of the voltage-current curve function to the power of 0.5. A calculating method of the first threshold voltage VTH by using the first equation may be referred to as a second-derivative method. In an embodiment, the first threshold voltage VTH may be calculated by using a constant current method. In an embodiment, the first threshold voltage VTH may be calculated by using a linear extrapolation method. However, the invention is not limited to the calculating method of the first threshold voltage VTH described above.

In an embodiment, the second threshold voltage VTH_CAL may be calculated by using the second equation. The second equation is as follows.

$$VTH\_CAL = \frac{\sqrt{I2} * VGS1 - \sqrt{I1} * VGS2}{\sqrt{I2} - \sqrt{I1}} \quad \text{[Second Equation]}$$

In the second equation, VTH_CAL denotes the second threshold voltage, VGS1 denotes a voltage difference between a first control electrode and a source electrode (or the second electrode) of the reference driving transistor when a first sensing data voltage between the first reference data voltage to the second reference data voltage is applied to the first control electrode of the reference driving transistor, VGS2 denotes a voltage difference between the first control electrode and the source electrode (or the second electrode) of the reference driving transistor when a second sensing data voltage between the first reference data voltage to the second reference data voltage is applied to the first control electrode of the reference driving transistor, I1 (IOLED1 in FIG. 4) denotes a first driving current corresponding to the first sensing data voltage, and I2 (IOLED2 in FIG. 4) denotes a second driving current corresponding to the second sensing data voltage.

In an embodiment, the error value ERR (error e[k] in FIG. 4) for generating the error function ERRF (effort function f(x) in FIG. 4) may calculated by subtracting the second threshold voltage VTH_CAL from the first threshold voltage VTH.

Additionally, the error value ERR may correspond to the each changed gate voltage VCAL. For example, a first curve function corresponding to a first gate voltage may be calculated. A first threshold voltage and a second threshold voltage of the first curve function may be calculated. A first error value may be calculated based on the first threshold voltage and the second threshold voltage of the first curve function. For example, an N-th curve function corresponding to a N-th gate voltage may be calculated. A first threshold voltage and a second threshold voltage of the N-th curve function may be calculated. An N-th error value may be calculated based on the first threshold voltage and the second threshold voltage of the N-th curve function. Additionally, in an embodiment, the gate voltage VCAL may be changed K times, such that the error value ERR may have the first error value to the K-th error value. The error function ERRF may be generated based on the first error value to the K-th error value.

In an embodiment, a tendency of the first error value to the K-th error value versus the second threshold voltage VTH_CAL may be modeled. A modeling function which the tendency is modeled may have a curve format. The error function ERRF may be a function which has an input as the second threshold voltage VTH_CAL and an output as the error value ERR corresponding to the second threshold voltage VTH_CAL.

The reference pixel measurer 700 may generate the error function ERRF and may output the error function ERRF to the driving controller 200. The driving controller 200 may store the error function ERRF. The error function may be generated and may be stored in the manufacturing process. In an embodiment, the gate voltage VCAL may be applied to the second control electrode of the reference driving transistor TDRR of the reference pixel PX-R. After the gate voltage VCAL is applied, the first reference data voltage to the second reference data voltage may be applied to the first control electrode of the reference driving transistor TDRR. After the first reference data voltage to the second reference data voltage may be applied, the voltage-current curve function, which is a function of the IDS-VGS of the reference driving transistor may be calculated. After the voltage-current curve function is calculated, the K first threshold voltages may be determined by changing the gate voltage VCAL by K times and the K second threshold voltages may be determined by changing the gate voltage VCAL by K times. After the first threshold voltage VTH and the second threshold voltage VTH_CAL is calculated, the K error values ERR, which is a difference between the K first threshold voltages and the K second threshold voltages, is calculated. After the error value ERR is calculated, the error function ERRF may be derived based on the K error values ERR.

In an embodiment, the display panel 100 may include a plurality of the reference pixels PX-R. The plurality of the reference pixels PX-R may include a first reference pixel, a second reference pixel and a third reference pixel. The first reference pixel may include a red reference light emitting element. The second reference pixel may include a green reference light emitting element. The third reference pixel may include a blue reference light emitting element. The reference pixel measurer 700 may receive a driving current of the first reference pixel, a driving current of the second reference pixel and a driving current of the third reference pixel. The reference pixel measurer 700 may generate a first error function corresponding to the first reference pixel. The reference pixel measurer 700 may generate a second error function corresponding to the second reference pixel. The reference pixel measurer 700 may generate a third error function corresponding to the third reference pixel. For example, the first error function may be referred to as a red error function, the second error function may be referred as a green error function, and the third error function may be referred to as a blue error function.

Figure 5:
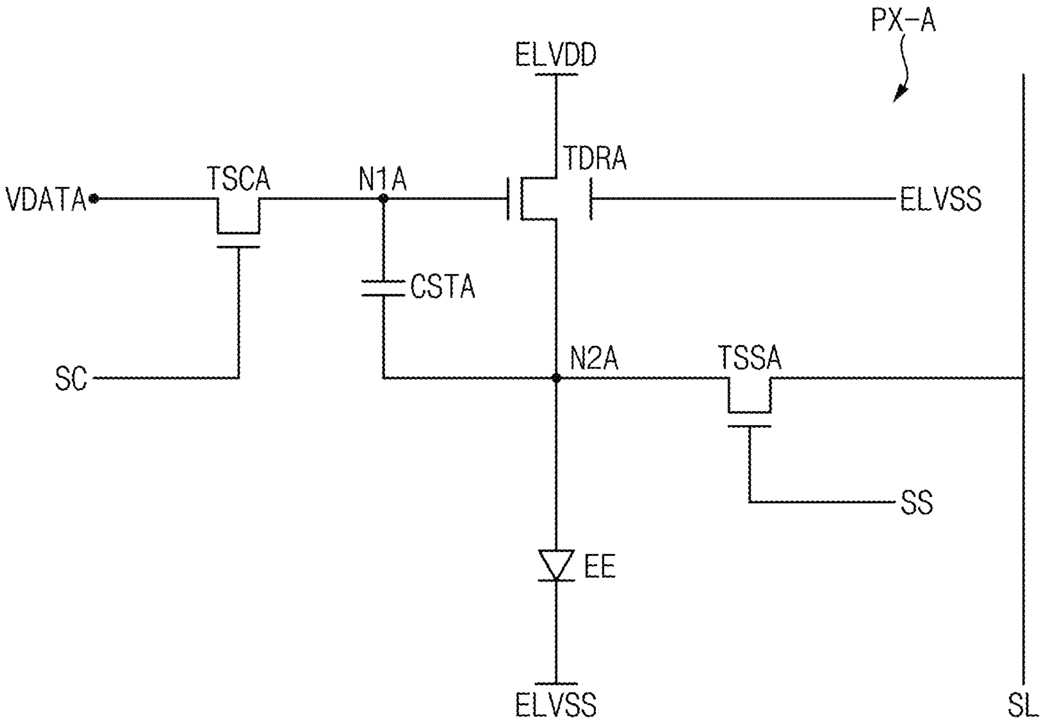
FIG. 5 is a circuit diagram illustrating an active pixel of display panel of FIG. 1.
Figure 6:
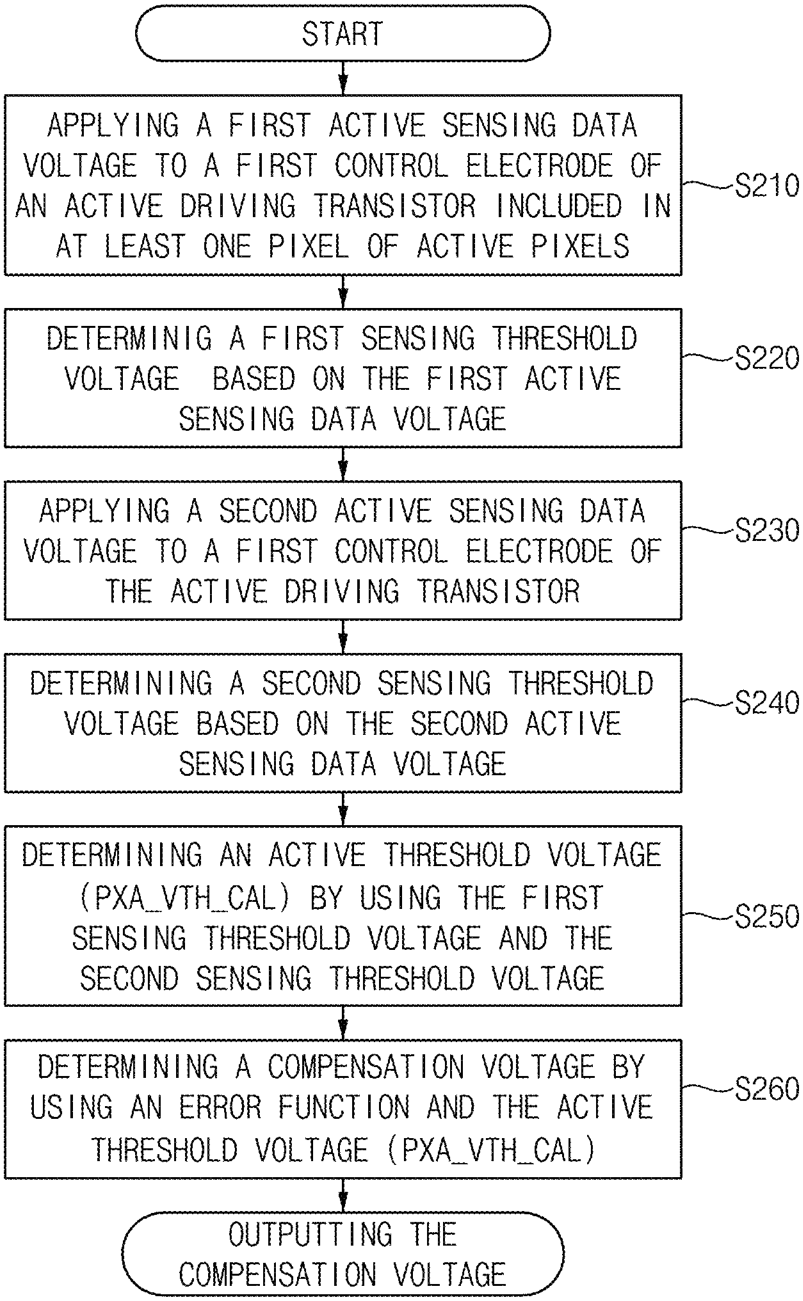
FIG. 6 is a flowchart illustrating a method in which a display device of FIG. 1 generates a compensation voltage.

FIG. 5 is a circuit diagram illustrating an active pixel of display panel of FIG. 1. FIG. 6 is a flowchart illustrating a method in which a display device of FIG. 1 generates a compensation voltage.

Referring to FIG. 1 and FIG. 4 to FIG. 6, the active pixel PX-A may include the active driving transistor TDRA, an active scan transistor TSCA, an active sensing transistor TSSA, an active storage capacitor CSTA and an active light emitting element EE. In an embodiment, for example, the active pixel PX-A may have a 3T-1C structure as shown in FIG. 6. Additionally, FIG. 4 illustrates an embodiment where transistors of the active pixel PX-A are N-type transistors, but the invention is not limited to a type of transistors included in the active pixel PX-A. In another embodiment, for example, the transistors included in the active pixel PX-A may be a P-type transistor.

The active driving transistor TDRA may have a first control electrode connected to a first active node N1A, a second control electrode that receives the first power voltage ELVDD or the second power voltage ELVSS, a first electrode that receives the first power voltage ELVDD and a second electrode connected to a second active node N2A. In an embodiment, for example, where the transistors included in the active pixel PX-A are N-type transistors, the second power voltage ELVSS may be applied to the second control electrode of the active driving transistor TDRA. In an embodiment, for example, where the transistors included in the active pixel PX-A are P-type transistors, the first power voltage ELVDD may be applied to the second control electrode of the active driving transistor TDRA. In an embodiment, the active driving transistor TDRA may generate a driving current based on a voltage of the first active node N1A.

The active scan transistor TSCA may include a control electrode that receives the scan gate signal SC, a first electrode that receives the data voltage VDATA and a second electrode connected to the first active node N1A. The active scan transistor TSCA may apply the data voltage VDATA to the first active node N1A in response to the scan gate signal SC.

The active sensing transistor TSSA may include a control electrode that receives the sensing gate signal SS, a first electrode connected to a sensing line SL and a second electrode connected to the second active node N2A. The active sensing transistor TSSA may apply the sensing current to the sensing line SL in response to the sensing gate signal SS.

The active storage capacitor CSTA may include a first electrode connected to the first active node N1A and a second electrode connected to the second active node N2A.

The light emitting element EE may include an anode connected to the second active node N2A and a cathode that receives the second power voltage ELVSS.

In an embodiment, in the blank period, the sensing operation may be performed to at least one pixel of the active pixels PX-A.

A first active sensing data voltage may be applied to the first control electrode of the active driving transistor TDRA included in the least one pixel (S210). A first sensing threshold voltage may be determined based on the first active sensing data voltage (S220). A second active sensing data voltage may be applied to the first control electrode of the active driving transistor TDRA (S230). A second sensing threshold voltage may be determined based on the second active sensing data voltage (S240). An active threshold voltage PXA_VTH_CAL may be determined by using the first sensing threshold voltage and the second sensing threshold voltage (S250). The compensation voltage VC may be determined by using the error function ERRF and the active threshold voltage PXA_VTH_CAL (S260). In an embodiment, the active threshold voltage PXA_VTH_CAL may be determined by using a third equation as shown in FIG. 4, but the invention is not limited thereto. The third equation is as follows.

[Third Equation]

$$\text{PXA\_VTH\_CAL} = \frac{\sqrt{VSEN2} * VGS1A - \sqrt{VSEN1} * VGS2A}{\sqrt{VSEN2} - \sqrt{VSEN1}}$$

In the third equation, PXA_VTH_CAL denotes the active threshold voltage, VGS1A denotes a voltage difference between a first control electrode and a source electrode (or the second electrode) of the active driving transistor of the least one pixel when a first active sensing data voltage included in the data voltage is applied to the first control electrode of the active driving transistor of the pixel, VGS2A denotes a voltage difference between the first control electrode and the source electrode of the active driving transistor of the least one pixel when a second active sensing data voltage included in the data voltage is applied, VSEN1 (VAFE1 in FIG. 4) denotes a first sensing threshold voltage corresponding to the first active sensing data voltage, and VSEN2 (VAFE2 in FIG. 4) denotes a second sensing threshold voltage corresponding to the second active sensing data voltage.

In an embodiment, in a first blank period, the first active sensing data voltage may be applied. In a second blank period after the first blank period, the second active sensing data voltage may be applied.

The sensing driver 600 may output the sensing data SD including the first sensing threshold voltage or the second sensing threshold voltage. The driving controller 200 may receive the sensing data SD. The driving controller 200 may calculate the active threshold voltage PXA_VTH_CAL based on the first sensing threshold voltage and the second sensing threshold voltage. A value obtained by adding the function result value FPXA_VTH_CAL (f(VTH_CAL) in FIG. 4) of the error function calculated by using the error function ERRF stored in the driving controller 200 and the active threshold voltage PXA_VTH_CAL and the active threshold voltage PXA_VTH_CAL may be calculated as compensation voltage VC. The driving controller 200 may output the data signal DATA based on or considering (e.g., by adding) the compensation voltage VC.

The reference pixel measurer 700 may generate the error function ERRF by changing the gate voltage VCAL applied to the second control electrode of the reference driving transistor TDRR. An accuracy of a compensation data (e.g., threshold voltage compensation data of the active driving transistor and/or mobility compensation data of the active driving transistor) of the active pixel PX-A may be improved through the error function ERRF.

Figure 7:
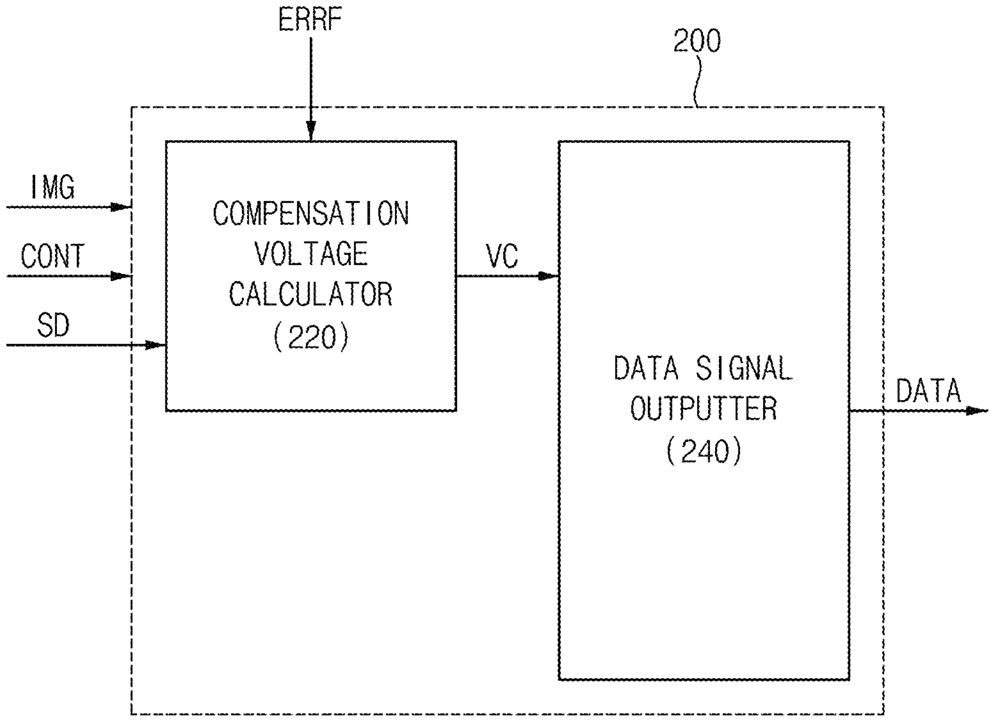
FIG. 7 is a block diagram illustrating an example of the driving controller of FIG. 1.

FIG. 7 is a block diagram illustrating an example of the driving controller of FIG. 1.

Referring to FIG. 1 and FIG. 6 to FIG. 7, in an embodiment, the driving controller 200 may include a compensation voltage calculator 220 and a data signal outputter 240.

In an embodiment, the error function ERRF may be stored in the compensation voltage calculator 220. The compensation voltage calculator 220 may receive the sensing data SD from the sensing driver 600. The compensation voltage calculator 220 may calculate the active threshold voltage PXA_VTH_CAL based on the sensing data SD. The compensation voltage calculator 220 may calculate the compensation voltage VC which is a sum of the function result value FPXA_VTH_CAL calculated by substituting the active threshold voltage PXA_VTH_CAL into the error function ERRF and the active threshold voltage PXA_VTH_CAL. The compensation voltage calculator 220 may apply the compensation voltage VC to the data signal outputter 240.

In an embodiment, the data signal outputter 240 may output the data signal DATA based on the compensation voltage VC.

Figure 8:
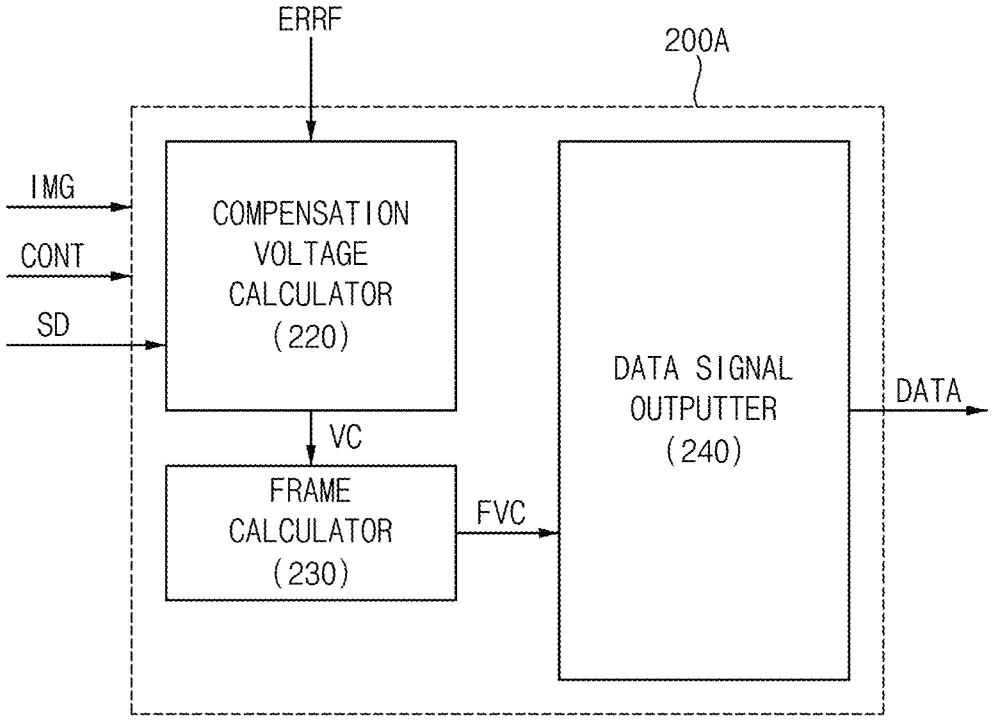
FIG. 8 is a block diagram illustrating another example of the driving controller of FIG. 1.

FIG. 8 is a block diagram illustrating another example of the driving controller of FIG. 1.

Referring to FIG. 1 and FIG. 6 to FIG. 8, in an embodiment, the driving controller 200A may include the compensation voltage calculator 220, the data signal outputter 240 and a frame calculator 230. The driving controller 200A of FIG. 7 is substantially the same as the driving controller of FIG. 6 except that the driving controller 200A further includes the frame calculator 230. Accordingly, in FIG. 8, the same reference numerals will be used to refer to the same or like elements as those of FIG. 7, and any repetitive detailed description thereof will be omitted or simplified.

In an embodiment, the error function ERRF may be stored in the compensation voltage calculator 220. The compensation voltage calculator 220 may receive the sensing data SD from the sensing driver 600. The compensation voltage calculator 220 may calculate the active threshold voltage PXA_VTH_CAL based on the sensing data SD. The compensation voltage calculator 220 may calculate the compensation voltage VC which is a sum of the function result value FPXA_VTH_CAL calculated by substituting the active threshold voltage PXA_VTH_CAL into the error function ERRF and the active threshold voltage PXA_VTH_CAL. In an embodiment, the compensation voltage calculator 220 may apply the compensation voltage VC to the frame calculator 230.

In the embodiment, the frame calculator 230 may store the compensation voltage VC of the least one pixel during a plurality of frames. For example, the compensation voltage VC of the least one pixel in a first frame of the plurality of frames may be stored. For example, the compensation voltage VC of the least one pixel in a second frame after the first frame may be stored. The frame calculator 230 may calculate an average of the compensation voltage (e.g., a first compensation voltage) of the least one pixel in the first frame and the compensation voltage (e.g., a second compensation voltage) of the least one pixel in the second frame. The average of the compensation voltage may be referred to as a final compensation voltage FVC. The frame calculator 230 may apply the final compensation voltage FVC to the data signal outputter 240. Accordingly, the data signal outputter 240 may output the data signal DATA based on the final compensation voltage FVC.

Figure 9:
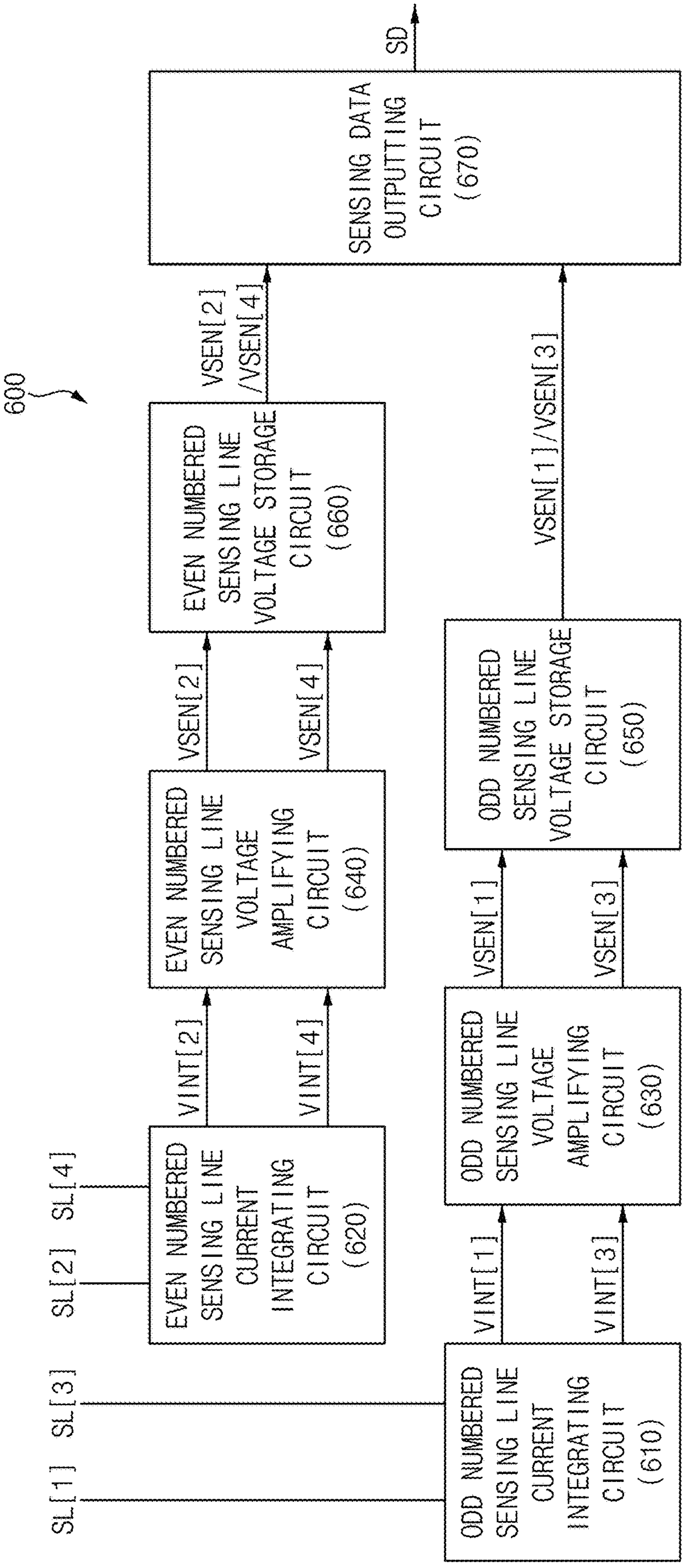
FIG. 9 is a block diagram illustrating an example of a sensing driver of FIG. 1.

FIG. 9 is a block diagram illustrating an example of a sensing driver of FIG. 1.

Referring to FIG. 1 and FIG. 9, in an embodiment, the sensing driver 600 may include an odd numbered sensing line current integrating circuit 610, an even numbered sensing line current integrating circuit 620, an odd numbered sensing line voltage amplifying circuit 630, an even numbered sensing line voltage amplifying circuit 640, an odd numbered sensing line voltage storage circuit 650, an even numbered sensing line voltage storage circuit 660 and a sensing data outputting circuit 670.

In an embodiment, the odd numbered sensing line current integrating circuit 610 may be connected to odd numbered sensing lines of the sensing lines SL[1], SL[2], SL[3], . . . , SL[2P−1] and SL[2P]. In an embodiment, for example, the odd numbered sensing line current integrating circuit 610 may be connected to the first sensing line SL[1] and the third sensing line SL[3]. The sensing current of the active pixel PX-A connected to the first sensing line SL[1] may be applied to the first sensing line SL[1]. The sensing current of the active pixel PX-A connected to the third sensing line SL[3] may be applied to the third sensing line SL[3]. The odd numbered sensing line current integrating circuit 610 may output a first integrated voltage VINT[1] corresponding to the sensing current of the first sensing line SL[1] and a third integrated voltage VINT[3] corresponding to the sensing current of the third sensing line SL[3].

In an embodiment, the even numbered sensing line current integrating circuit 620 may be connected to even numbered sensing lines of the sensing lines SL[1], SL[2], SL[3], . . . , SL[2P−1] and SL[2P]. In an embodiment, for example, the even numbered sensing line current integrating circuit 620 may be connected to the second sensing line SL[2] and the fourth sensing line SL[4]. The sensing current of the active pixel PX-A connected to the second sensing line SL[2] may be applied to the second sensing line SL[2]. The sensing current of the active pixel PX-A connected to the fourth sensing line SL[4] may be applied to the fourth sensing line SL[4]. The even numbered sensing line current integrating circuit 620 may output a second integrated voltage VINT[2] corresponding to the sensing current of the second sensing line SL[2] and a fourth integrated voltage VINT[4] corresponding to the sensing current of the fourth sensing line SL[4].

The odd numbered sensing line voltage amplifying circuit 630 may receive the first integrated voltage VINT[1] and the third integrated voltage VINT[3]. The odd numbered sensing line voltage amplifying circuit 630 may output a first odd numbered sensing threshold voltage VSEN[1] corresponding to the first integrated voltage VINT[1]. The odd numbered sensing line voltage amplifying circuit 630 may output a second odd numbered sensing threshold voltage VSEN[3] corresponding to the third integrated voltage VINT[3].

The even numbered sensing line voltage amplifying circuit 640 may receive the second integrated voltage VINT[2] and the fourth integrated voltage VINT[4]. The even numbered sensing line voltage amplifying circuit 640 may output a first even numbered sensing threshold voltage VSEN[2] corresponding to the second integrated voltage VINT[2]. The even numbered sensing line voltage amplifying circuit 640 may output a second even numbered sensing threshold voltage VSEN[4] corresponding to the fourth integrated voltage VINT[4].

The odd numbered sensing line voltage storage circuit 650 may receive and may store the first odd numbered sensing threshold voltage VSEN[1] and the second odd numbered sensing threshold voltage VSEN[3]. The odd numbered sensing line voltage storage circuit 650 may output the first odd numbered sensing threshold voltage VSEN[1] or the second odd numbered sensing threshold voltage VSEN[3].

The even numbered sensing line voltage storage circuit 660 may receive and may store the first even numbered sensing threshold voltage VSEN[2] and the second even numbered sensing threshold voltage VSEN[4]. The even numbered sensing line voltage storage circuit 660 may output the first even numbered sensing threshold voltage VSEN[2] or the second even numbered sensing threshold voltage VSEN[4].

The sensing data outputting circuit 670 may output the first odd numbered sensing threshold voltage VSEN[1], the second odd numbered sensing threshold voltage VSEN[3], the first even numbered sensing threshold voltage VSEN[2] and the second even numbered sensing threshold voltage VSEN[4] as the sensing data SD.

The sensing driver 600 may sense an adjacent sensing line SL through one sensing channel, such that the number of sensing channels may be reduced.

Figure 10:
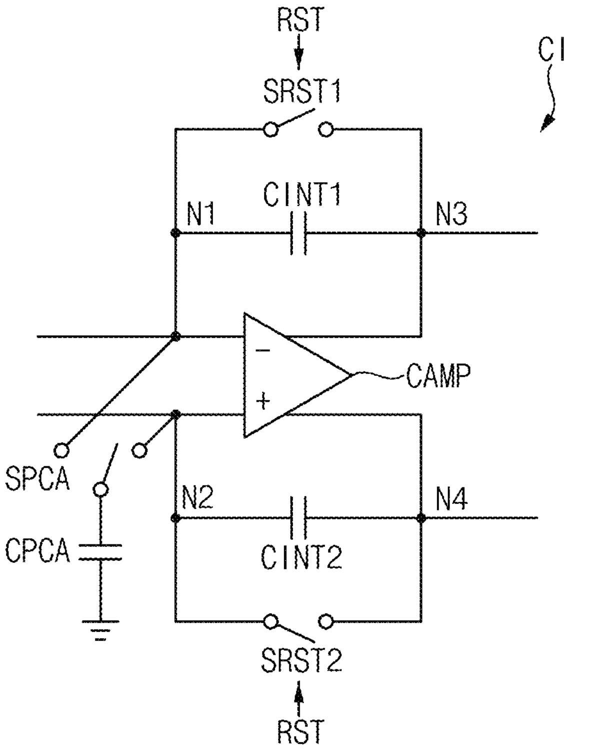
FIG. 10 is a circuit diagram illustrating a current integrated circuit included in a display device of FIG. 1.

FIG. 10 is a circuit diagram illustrating a current integrated circuit included in a display device of FIG. 1.

Referring to FIG. 1 and FIG. 9 to FIG. 10, in an embodiment, each of the odd numbered sensing line current integrating circuit 610 and the even numbered sensing line current integrating circuit 620 may include a current integrating circuit CI.

In an embodiment, as shown in FIG. 10, the current integrating circuit CI may include a integrating amplifier CAMP including a first input terminal connected to a first node N1, a second input terminal connected to a second node N2, a first output terminal connected to a third node and a second output terminal connected to a fourth node N4, a first integrating capacitor CINT1 including a first electrode connected to the first node N1 and a second electrode connected to the third node N3, a second integrating capacitor CINT2 including a first electrode connected to the second node N2 and a second electrode connected to the fourth node N4, a first reset switching element SRST1 including a first terminal connected to the first node N1 and the second terminal connected to the third node N3, a second reset switching element SRST2 including a first terminal connected to the second node N2 and the second terminal connected to the fourth node N4 and a capacitor array switching element SPCA including a first terminal connected to the first node N1 or the second node N2 and a second terminal connected to a capacitor array switching circuit CPCA. For example, the current integrating circuit CI may refer to as a differential amplifying circuit that differentially amplifies the input of the first input terminal and the input of the second input terminal. In an embodiment, for example, the current integrating circuit CI may be a 2-input-2-output differential amplifier circuit.

In an embodiment, where the odd numbered sensing line current integrating circuit 610 includes the current integrating circuit CI, the first node N1 may be connected to the first sensing line SL[1] and the second node N2 may be connected to the third sensing line SL[3]. Accordingly, the third node N3 may output the first integrated voltage VINT[1] and the fourth node N4 may output the third integrated voltage VINT[3]. For example, when the sensing current is applied to the first sensing line SL[1], the sensing current is not applied to the third sensing line SL[3]. When the sensing current is not applied to the third sensing line SL[3], the first terminal of the capacitor array switching element SPCA may be connected to the first node N1. For example, when the sensing current is applied to the third sensing line SL[3], the sensing current is not applied to the first sensing line SL[1]. When the sensing current is not applied to the first sensing line SL[1], the first terminal of the capacitor array switching element SPCA may be connected to the second node N2.

Generally, a characteristic of the odd numbered sensing line and a characteristic of the even numbered sensing line may be different from each other. The current integrating circuit CI according to an embodiment of the invention may be dividedly provided and amplifies one of the sensing current flowing the odd numbered sensing line and the sensing current flowing the even numbered sensing line, such that an accuracy of the sensing data SD may be improved.

In an embodiment, where the even numbered sensing line current integrating circuit 620 includes the current integrating circuit CI, the first node N1 may be connected to the second sensing line SL[2] and the second node N2 may be connected to the fourth sensing line SL[4]. Accordingly, the third node N3 may output the second integrated voltage VINT[2] and the fourth node N4 may output the fourth integrated voltage VINT[4]. For example, when the sensing current is applied to the second sensing line SL[2], the sensing current is not applied to the fourth sensing line SL[4]. When the sensing current is not applied to the fourth sensing line SL[4], the first terminal of the capacitor array switching element SPCA may be connected to the first node N1. For example, when the sensing current is applied to the fourth sensing line SL[4], the sensing current is not applied to the second sensing line SL[2]. When the sensing current is not applied to the second sensing line SL[2], the first terminal of the capacitor array switching element SPCA may be connected to the second node N2.

Generally, a characteristic of the odd numbered sensing line and a characteristic of the even numbered sensing line may be different from each other. The current integrating circuit CI according to an embodiment of the invention may be dividedly provided and amplify one of the sensing current flowing the odd numbered sensing line and the sensing current flowing the even numbered sensing line, such that an accuracy of the sensing data SD may be improved.

Figure 11:
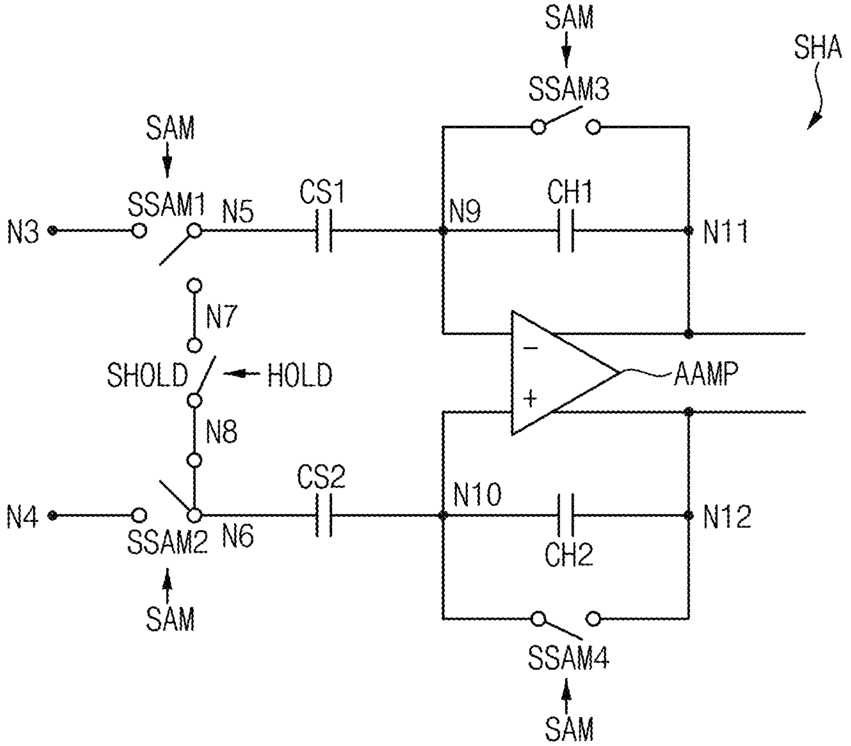
FIG. 11 is a circuit diagram illustrating a voltage amplifying circuit included in a display device of FIG. 1.

FIG. 11 is a circuit diagram illustrating a voltage amplifying circuit included in a display device of FIG. 1.

Referring to FIG. 1 and FIG. 9 to FIG. 11, in an embodiment, each of the odd numbered sensing line voltage amplifying circuit 630 and the even numbered sensing line voltage amplifying circuit 640 may include a voltage amplifying circuit SHA.

In an embodiment, as shown in FIG. 11. the voltage amplifying circuit SHA may include a first sampling switching circuit SSAM1 including a first terminal connected to the third node N3 or a seventh node N7 and a second terminal connected to a fifth node N5, a second sampling switching circuit SSAM2 including a first terminal connected to the fourth node N4 or an eighth node N8 and a second terminal connected to a sixth node N6, a hold switching element SHOLD including a first terminal connected to the seventh node N7 and a second terminal connected to the eighth node N8, a first sampling capacitor CS1 including a first electrode connected to the fifth node N5 and a second electrode connected to a ninth node N9, a second sampling capacitor CS2 including a first electrode connected to the sixth node N6 and a second electrode connected to a tenth node N10, an amplifying amp AAMP including a first input terminal connected to the ninth node N9, a second input terminal connected to the tenth node N10, a first output terminal connected to an eleventh node N11 and a second output terminal connected to a twelfth node N12, a first hold capacitor CH1 including a first electrode connected to the ninth node N9 and a second electrode connected to the eleventh node N11, a second hold capacitor CH2 including a first electrode connected to the tenth node N10 and a second electrode connected to the twelfth node N12, a third sampling switching circuit SSAM3 including a first terminal connected to the ninth node N9 and a second terminal connected to the eleventh node N11 and a fourth sampling switching circuit SSAM4 including a first terminal connected to the tenth node N10 and a second terminal connected to the twelfth node N12.

In an embodiment, where the odd numbered sensing line voltage amplifying circuit 630 includes the voltage amplifying circuit SHA, the first terminal of the first sampling switching element SSAM1 may receive the first integrated voltage VINT[1] and the first terminal of the second sampling switching element SSAM2 may receive the third integrated voltage VINT[3]. Accordingly, the eleventh node N11 may output the first odd numbered sensing threshold voltage VSEN[1] and the twelfth node N12 may output the second odd numbered sensing threshold voltage VSEN[3].

In an embodiment, where the even numbered sensing line voltage amplifying circuit 640 includes the voltage amplifying circuit SHA, the first terminal of the first sampling switching element SSAM1 may receive the second integrated voltage VINT[2] and the first terminal of the second sampling switching element SSAM2 may receive the fourth integrated voltage VINT[4]. Accordingly, the eleventh node N11 may output the first even numbered sensing threshold voltage VSEN[2] and the twelfth node N12 may output the second even numbered sensing threshold voltage VSEN[4].

Generally, the current integrating circuit may have an offset voltage. Additionally, each of the current integrating circuit has different characteristics from each other, such that an output voltage may not be uniform. The voltage amplifying circuit according to an embodiment of the invention may reduce the influence due to the offset voltage and the influence due to different characteristics, such that a reliability of the output voltage may be improved.

Figure 12:
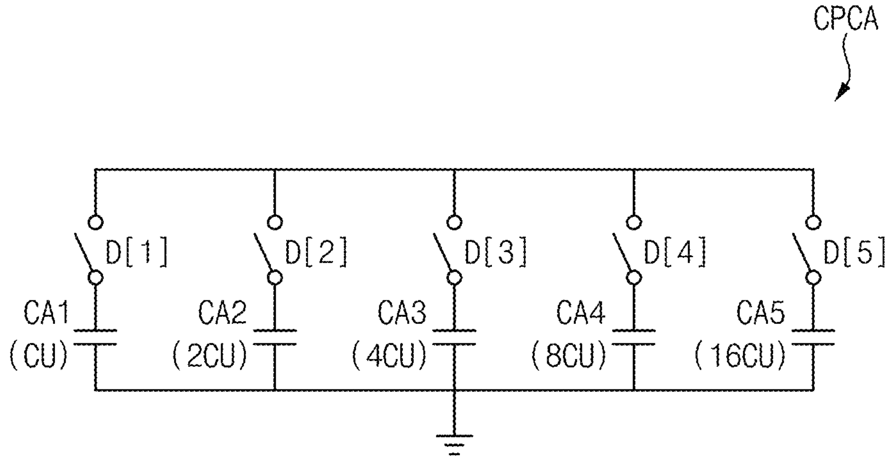
FIG. 12 is a circuit diagram illustrating a capacitor array circuit included in a current integrating circuit of FIG. 10.

FIG. 12 is a circuit diagram illustrating a capacitor array circuit included in a current integrating circuit of FIG. 10.

Referring to FIG. 1, FIG. 9 and FIG. 12, in an embodiment, a charging capacity of the capacitor array circuit CPCA may be changed in response to a capacitor array signal. In an embodiment, for example, the capacitor array signal may include a first to fifth capacitor array signal D[1], D[2], D[3], D[4] and D[5], as show in FIG. 12. For example, when the first capacitor array signal D[1] is applied, a first array capacitor CA1 having a first charging capacity CU may be connected to the first input terminal of the current integrating circuit CI or the second input terminal of the current integrating circuit CI. For example, when the second capacitor array signal D[2] is applied, a second array capacitor CA2 having a second charging capacity 2CU may be connected to the first input terminal of the current integrating circuit CI or the second input terminal of the current integrating circuit CI. For example, when the third capacitor array signal D[3] is applied, a third array capacitor CA3 having a third charging capacity 4CU may be connected to the first input terminal of the current integrating circuit CI or the second input terminal of the current integrating circuit CI. For example, when the fourth capacitor array signal D[4] is applied, a fourth array capacitor CA1 having a fourth charging capacity 8CU may be connected to the first input terminal of the current integrating circuit CI or the second input terminal of the current integrating circuit CI. For example, when the fifth capacitor array signal D[5] is applied, a fifth array capacitor CA5 having a fifth charging capacity 16CU may be connected to the first input terminal of the current integrating circuit CI or the second input terminal of the current integrating circuit CI. For example, the second charging capacity 2CU may be twice the first charging capacity CU. For example, the third charging capacity 4CU may be twice the second charging capacity 2CU. For example, the fourth charging capacity 8CU may be twice the third charging capacity 4CU. For example, the fifth charging capacity 16CU may be twice the fourth charging capacity 8CU. The charging capacity of the capacitor array circuit CPCA may be changed, an influence of a parasitic capacitor of the sensing lines SL[1], SL[2], SL[3], . . . , SL[2P−1] and SL[2P] may be reduced.

Figure 13:
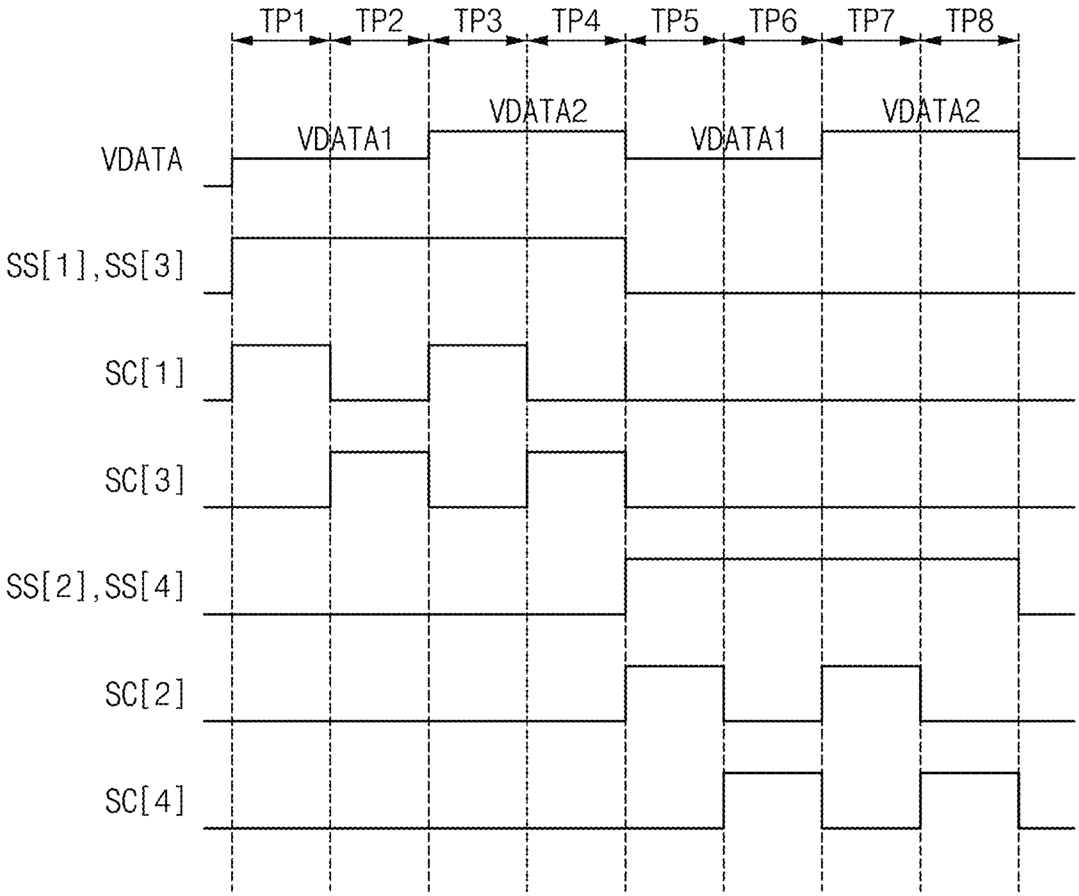
FIG. 13 is a signal timing diagram illustrating a signal applied to an active pixel of FIG. 1.

FIG. 13 is a signal timing diagram illustrating a signal applied to an active pixel of FIG. 1.

Referring to FIG. 1, FIG. 5, FIG. 6, FIG. 9 and FIG. 13, in an embodiment, a first active pixel which is the active pixel PX-A connected to the first sensing line SL[1] may receive a first sensing gate signal SS[1], a first scan gate signal SC[1], the first active sensing data voltage VDATA1 and the second active sensing data voltage VDATA2. A second active pixel which is the active pixel PX-A connected to the second sensing line SL[2] may receive a second sensing gate signal SS[2], a second scan gate signal SC[2], the first active sensing data voltage VDATA1 and the second active sensing data voltage VDATA2. A third active pixel which is the active pixel PX-A connected to the third sensing line SL[3] may receive a third sensing gate signal SS[3], a third scan gate signal SC[3], the first active sensing data voltage VDATA1 and the second active sensing data voltage VDATA2. A fourth active pixel which is the active pixel PX-A connected to the fourth sensing line SL[4] may receive a fourth sensing gate signal SS[4], a fourth scan gate signal SC[4], the first active sensing data voltage VDATA1 and the second active sensing data voltage VDATA2.

In a first period TP1, the data voltage VDATA may have the first active sensing data voltage VDATA1, the first sensing gate signal SS[1] and the third sensing gate signal SS[3]may have an activation level, the first scan gate signal SC[1] may have an activation level and the third scan gate signal SC[3] may have an inactivation level. Accordingly, the first active sensing data voltage VDATA1 may be applied to the first control electrode of the active driving transistor TDRR of the first active pixel in response to the first scan gate signal SC[1]. Accordingly, the sensing current corresponding to the first active sensing data voltage VDATA1 may be applied to the first sensing line SL[1]. The third scan gate signal SC[3] may have an inactivation level, the third sensing line SL[3] may not receive the sensing current. In the first period TP1, the first sensing threshold voltage corresponding to the first active sensing data voltage VDATA1 of the first active pixel may be outputted.

In a second period TP2, the data voltage VDATA may have the first active sensing data voltage VDATA1, the first sensing gate signal SS[1] and the third sensing gate signal SS[3] may have an activation level, the first scan gate signal SC[1] may have an inactivation level and the third scan gate signal SC[3] may have an activation level. Accordingly, the first active sensing data voltage VDATA1 may be applied to the first control electrode of the active driving transistor TDRR of the third active pixel in response to the third scan gate signal SC[3]. Accordingly, the sensing current corresponding to the first active sensing data voltage VDATA1 may be applied to the third sensing line SL[3]. The first scan gate signal SC[1] may have an inactivation level, the first sensing line SL[1] may not receive the sensing current. In the second period TP2, the first sensing threshold voltage corresponding to the first active sensing data voltage VDATA1 of the third active pixel may be outputted.

In a third period TP3, the data voltage VDATA may have the second active sensing data voltage VDATA2, the first sensing gate signal SS[1] and the third sensing gate signal SS[3] may have an activation level, the first scan gate signal SC[1] may have an activation level and the third scan gate signal SC[3] may have an inactivation level. Accordingly, the second active sensing data voltage VDATA2 may be applied to the first control electrode of the active driving transistor TDRR of the third active pixel in response to the first scan gate signal SC[1]. Accordingly, the sensing current corresponding to the second active sensing data voltage VDATA2 may be applied to the first sensing line SL[1]. The third scan gate signal SC[3] may have an inactivation level, the third sensing line SL[3] may not receive the sensing current. In the third period TP3, the second sensing threshold voltage corresponding to the second active sensing data voltage VDATA2 of the first active pixel may be outputted.

In a fourth period TP4, the data voltage VDATA may have the second active sensing data voltage VDATA2, the first sensing gate signal SS[1] and the third sensing gate signal SS[3] may have an activation level, the first scan gate signal SC[1] may have an inactivation level and the third scan gate signal SC[3] may have an activation level. Accordingly, the second active sensing data voltage VDATA2 may be applied to the first control electrode of the active driving transistor TDRR of the third active pixel in response to the third scan gate signal SC[3]. Accordingly, the sensing current corresponding to the second active sensing data voltage VDATA2 may be applied to the third sensing line SL[3]. The first scan gate signal SC[1] may have an inactivation level, the first sensing line SL[1] may not receive the sensing current. In the fourth period TP4, the second sensing threshold voltage corresponding to the second active sensing data voltage VDATA2 of the third active pixel may be outputted.

In a fifth period TP5, the data voltage VDATA may have the first active sensing data voltage VDATA1, the second sensing gate signal SS[2] and the fourth sensing gate signal SS[4] may have an activation level, the second scan gate signal SC[2] may have an activation level and the fourth scan gate signal SC[4] may have an inactivation level. Accordingly, the first active sensing data voltage VDATA1 may be applied to the first control electrode of the active driving transistor TDRR of the second active pixel in response to the second scan gate signal SC[2]. Accordingly, the sensing current corresponding to the first active sensing data voltage VDATA1 may be applied to the second sensing line SL[2]. The fourth scan gate signal SC[4]may have an inactivation level, the fourth sensing line SL[4] may not receive the sensing current. In the fifth period TP5, the first sensing threshold voltage corresponding to the first active sensing data voltage VDATA1 of the second active pixel may be outputted.

In a sixth period TP6, the data voltage VDATA may have the first active sensing data voltage VDATA1, the second sensing gate signal SS[2] and the fourth sensing gate signal SS[4] may have an activation level, the second scan gate signal SC[2] may have an inactivation level and the fourth scan gate signal SC[4] may have an activation level. Accordingly, the first active sensing data voltage VDATA1 may be applied to the first control electrode of the active driving transistor TDRR of the fourth active pixel in response to the fourth scan gate signal SC[4]. Accordingly, the sensing current corresponding to the first active sensing data voltage VDATA1 may be applied to the fourth sensing line SL[4]. The second scan gate signal SC[2] may have an inactivation level, the second sensing line SL[2] may not receive the sensing current. In the sixth period TP6, the first sensing threshold voltage corresponding to the first active sensing data voltage VDATA1 of the fourth active pixel may be outputted.

In a seventh period TP7, the data voltage VDATA may have the second active sensing data voltage VDATA2, the second sensing gate signal SS[2] and the fourth sensing gate signal SS[4] may have an activation level, the second scan gate signal SC[2] may have an activation level and the fourth scan gate signal SC[4] may have an inactivation level. Accordingly, the second active sensing data voltage VDATA2 may be applied to the first control electrode of the active driving transistor TDRR of the fourth active pixel in response to the second scan gate signal SC[2]. Accordingly, the sensing current corresponding to the second active sensing data voltage VDATA2 may be applied to the second sensing line SL[2]. The fourth scan gate signal SC[4] may have an inactivation level, the fourth sensing line SL[4] may not receive the sensing current. In the seventh period TP7, the second sensing threshold voltage corresponding to the second active sensing data voltage VDATA2 of the second active pixel may be outputted.

In an eighth period TP8, the data voltage VDATA may have the second active sensing data voltage VDATA2, the second sensing gate signal SS[2] and the fourth sensing gate signal SS[4] may have an activation level, the second scan gate signal SC[2] may have an inactivation level and the fourth scan gate signal SC[4] may have an activation level. Accordingly, the second active sensing data voltage VDATA2 may be applied to the first control electrode of the active driving transistor TDRR of the fourth active pixel in response to the fourth scan gate signal SC[4]. Accordingly, the sensing current corresponding to the second active sensing data voltage VDATA2 may be applied to the fourth sensing line SL[4]. The second scan gate signal SC[2] may have an inactivation level, the second sensing line SL[2] may not receive the sensing current. In the eighth period TP8, the second sensing threshold voltage corresponding to the second active sensing data voltage VDATA2 of the fourth active pixel may be outputted.

Figure 14:
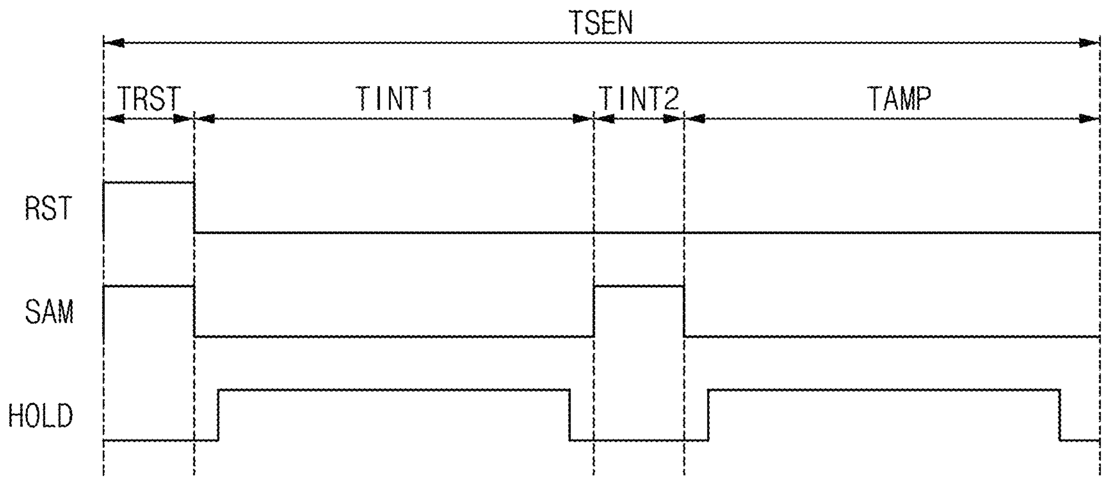
FIG. 14 is a signal timing diagram illustrating a signal applied to a voltage amplifying circuit of FIG. 11 and a current integrating circuit of FIG. 10.

FIG. 14 is a signal timing diagram illustrating a signal applied to a voltage amplifying circuit of FIG. 11 and a current integrating circuit of FIG. 10.

Referring to FIG. 10 to FIG. 12 and FIG. 13 to FIG. 14, a frame period may include an offset delete period TSEN. The offset delete period TSEN may include a reset period TRST, a first integrating period TINT1, a second integrating period TINT2 and an amplifying period TAMP. In an embodiment, as shown in FIG. 10, the first reset switching element SRST1 and the second reset switching element SRST2 may receive a reset signal RST. In an embodiment, as shown in FIG. 11, the first sampling switching element SSAM1, the second sampling switching element SSAM2, the third sampling switching element SSAM3 and the fourth sampling switching element SSAM4 may receive a sampling signal SAM. The hold switching signal SHOLD may receive a hold signal HOLD.

In the reset period TRST, the reset signal RST may have an activation level, the sampling signal SAM may have an activation level and the hold signal HOLD may have an inactivation level. The reset signal RST may have the activation level in the reset period TRST, such that the first node N1 and the third node N3 may be connected to each other and the second node N2 and the fourth node N4 may be connected to each other. Accordingly, the first integrating capacitor CINT1 and the second integrating capacitor CINT2 may be initialized as the offset voltage. The sampling signal SAM may have an activation level in the reset period TRST, such that the third node N3 and the fifth node N5 may be connected to each other and the fourth node N4 and the sixth node N6 may be connected to each other. Additionally, the ninth node N9 and the eleventh node N11 may be connected to each other and the tenth node N10 and the twelfth node N12 may be connected to each other. Accordingly, the offset voltage of the integrating amplifier CAMP may be stored in the first sampling capacitor CS1 and the second sampling capacitor CS2.

In the first integrating period TINT1, the reset signal RST may have an inactivation level, the sampling signal SAM may have an inactivation level, the hold signal HOLD may be changed to an activation level. The reset signal RST may have the inactivation level in the first integrating period TINT1, such that the sensing current may be integrated. The sampling signal SAM may have an inactivation level in the first integrating period TINT1, such that the fifth node N5 and the seventh node N7 may be connected to each other and the sixth node N6 and the eighth node N8 may be connected to each other. The hold signal HOLD may be changed, so that the seventh node N7 and the eighth node N8 may be connected to each other. In the first integrating period TINT1, the amplifying amp AAMP may amplify the offset voltage.

In the second integrating period TINT2, the reset signal RST may have an inactivation level, the sampling signal SAM may have an activation level, the hold signal HOLD may have an inactivation level. The sampling signal SAM may have the activation level in the second integrating period TINT, such that the third node N3 and the fifth node N5 may be connected to each other and the fourth node N4 and the sixth node N6 may be connected to each other. The hold signal HOLD may have an inactivation level, such that the seventh node N7 and the eighth node N8 may not be connected to each other. In the second integrating period TINT2, an integrated voltage which the sensing current is integrated may be stored in the first sampling capacitor CS1 or the second sampling capacitor CS2.

In the amplifying period TAMP, the reset signal RST may have an inactivation level, the sampling signal SAM may have an inactivation level, the hold signal HOLD may be changed to activation level. The integrated voltage may be amplified in the amplifying period TAMP.

In an embodiment, the sensing threshold voltage may be a voltage obtained by subtracting the offset voltage from the integrated voltage.

The sensing threshold voltage of a conventional display device includes the offset voltage, such that obtaining an accurate sensing threshold voltage may be difficult. In an embodiment of the invention, the sensing threshold voltage may be a voltage obtained by subtracting the offset voltage from the integrated voltage, such that a reliability of the sensing threshold voltage may be improved.

Figure 15:
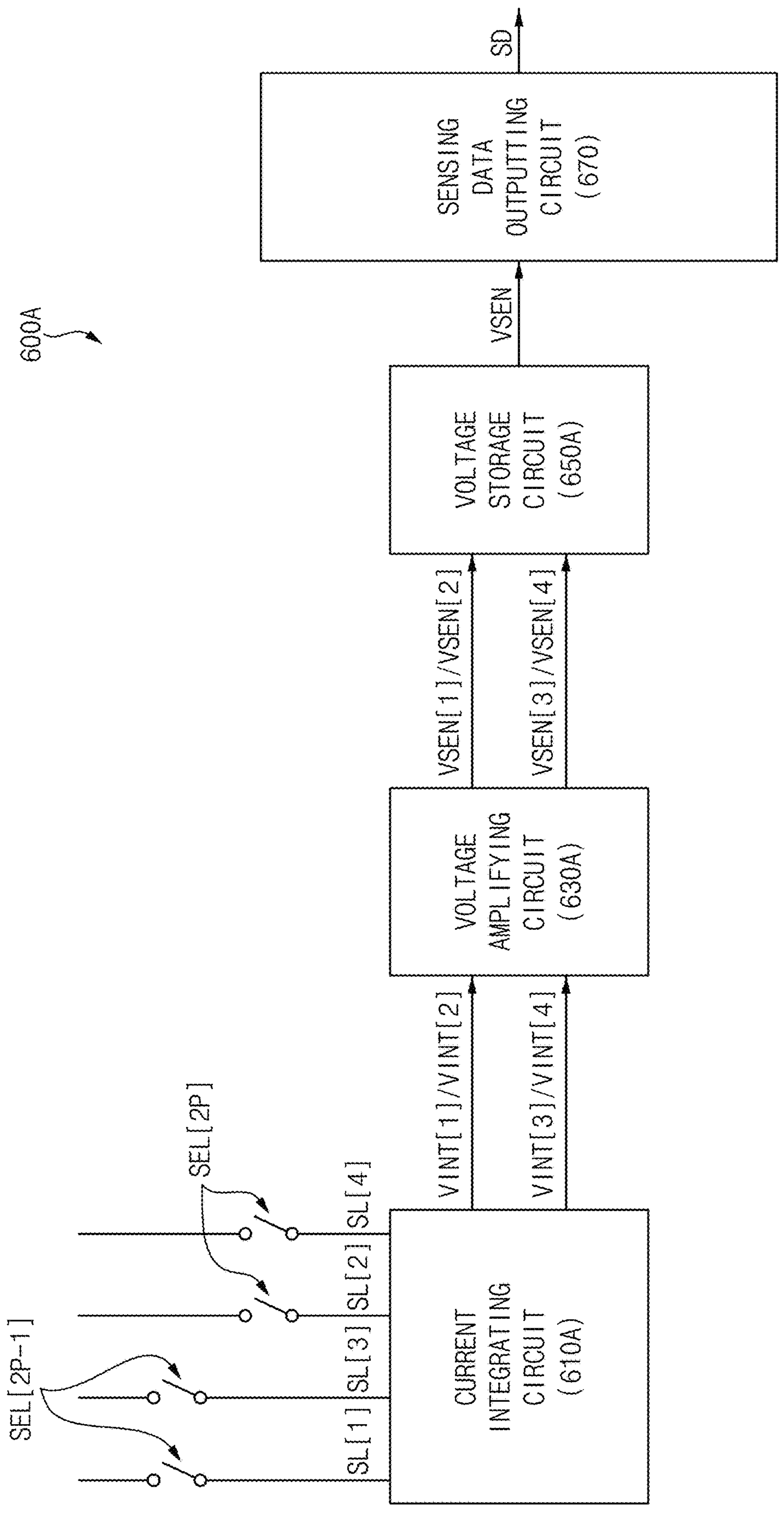
FIG. 15 is a block diagram illustrating an example of a sensing driver of FIG. 1.

FIG. 15 is a block diagram illustrating an example of a sensing driver of FIG. 1.

Referring to FIG. 1, FIG. 6 and FIG. 15, in an embodiment, the sensing driver 600A may include a current integrating circuit 610A, a voltage amplifying circuit 630A, a voltage storage circuit 650A and the sensing data outputting circuit 670. The current integrating circuit 610A may be connected to the first sensing line SL[1], the second sensing line SL[2], the third sensing line SL[3] and the fourth sensing line SL[4]. The first sensing line SL[1] and the third sensing line SL[3] may be connected to the current integrating circuit 610A in response to an odd numbered sensing line control signal SEL[2P−1]. The second sensing line SL[2] and the fourth sensing line SL[4] may be connected to the current integrating circuit 610A in response to an even numbered sensing line control signal SEL[2P].

When the first sensing line SL[1] and the third sensing line SL[3] are connected to the current integrating circuit 610A in response to an odd numbered sensing line control signal SEL[2P−1], the current integrating circuit 610A may output the first integrated voltage VINT[1] and the third integrated voltage VINT[3]. The voltage amplifying circuit 630A may output the first odd numbered sensing threshold voltage VSEN[1] corresponding to the first integrated voltage VINT[1] and may output the second odd numbered sensing threshold voltage VSEN[3] corresponding to the third integrated voltage VINT[3].

When the second sensing line SL[2] and the fourth sensing line SL[4] are connected to the current integrating circuit 610A in response to an even numbered sensing line control signal SEL[2P], the current integrating circuit 610A may output the second integrated voltage VINT[2] and the fourth integrated voltage VINT[4]. The voltage amplifying circuit 630A may output the first even numbered sensing threshold voltage VSEN[2] corresponding to the second integrated voltage VINT[2] and may output the second even numbered sensing threshold voltage VSEN[4] corresponding to the fourth integrated voltage VINT[4].

The voltage storage circuit 650A may output one of the first odd numbered sensing threshold voltage VSEN[1], the second odd numbered sensing threshold voltage VSEN[2], the first even numbered sensing threshold voltage VSEN[3] and the second even numbered sensing threshold voltage VSEN[4] as the sensing threshold voltage VSEN. The sensing data outputting circuit 670 may output the sensing data SD including the sensing threshold voltage VSEN.

Figure 16:
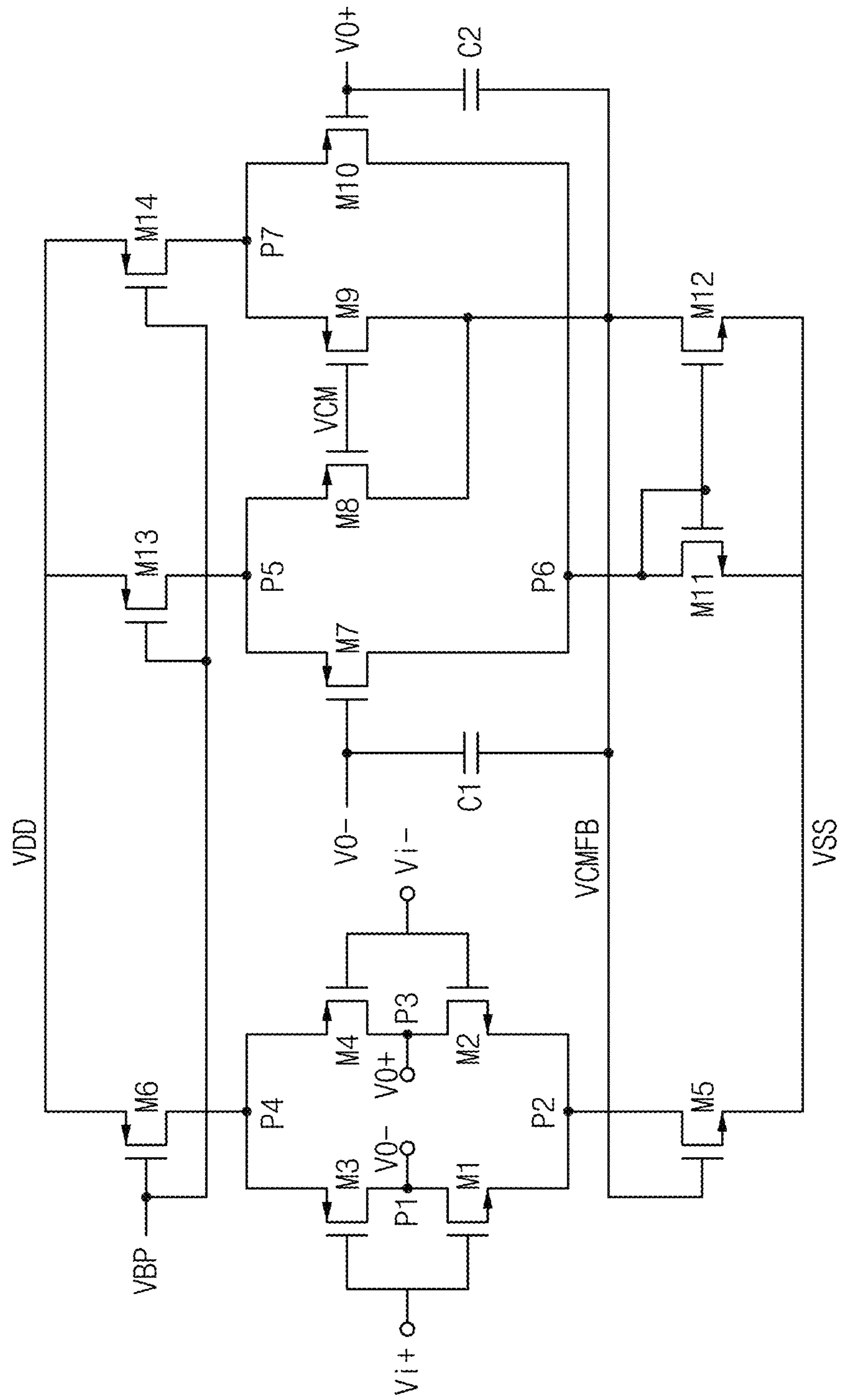
FIG. 16 is a circuit diagram illustrating an example of an integrating amplifier of a current integrating circuit of FIG. 10 and an amplifying amp of a voltage amplifying circuit of FIG. 11.

FIG. 16 is a circuit diagram illustrating an example of an integrating amplifier CAMP of a current integrating circuit CI of FIG. 10 and an amplifying amp AAMP of a voltage amplifying circuit SHA of FIG. 11.

Referring to FIG. 10, FIG. 11 and FIG. 16, in an embodiment, the integrating amplifier CAMP and/or the amplifying amp AAMP may include a first transistor M1, a second transistor M2, a third transistor M3, a fourth transistor M4, a fifth transistor M5, a sixth transistor M6, a seventh transistor M7, an eighth transistor M8, a ninth transistor M9, a tenth transistor M10, an eleventh transistor M11, a twelfth transistor M12, a thirteenth transistor M13, a fourteenth transistor M14, a first capacitor C1 and a second capacitor C2.

The first transistor M1 may include a control electrode that receives a first terminal voltage Vi+, a first electrode connected to a first node P1 and a second electrode connected to a second node P2. The second transistor M2 may include a control electrode that receives a second terminal voltage Vi−, a first electrode connected to a third node P3 and a second electrode connected to the second node P2. The third transistor M3 may include a control electrode that receives the first terminal voltage Vi+, a first electrode connected to a fourth node P4 and a second electrode connected to the first node P1. The fourth transistor M4 may include a control electrode that receives the second terminal voltage Vi−, a first electrode connected to the fourth node P4 and a second electrode connected to the third node P3.

In an embodiment, a voltage of the first node P1 may be a first output terminal voltage VO−. A voltage of the third node P3 may be a second output terminal voltage VO+.

The fifth transistor M5 may include a control electrode that receives a first bias voltage VCMFB, a first electrode connected to the second node P2 and a second electrode that receives a low power voltage VSS. The first bias voltage VCMFB may be set by a setter. The sixth transistor M6 may include a control electrode that receives a second bias voltage VBP, a first electrode that receives a high power voltage VDD and a second electrode connected to the fourth node P4. The second bias voltage VBP may have an activation level such that turns-on the sixth transistor M6. The high power voltage VDD may be higher than the low power voltage VSS.

The seventh transistor M7 may include a control electrode that receives the first output terminal voltage VO−, a first electrode connected to a fifth node P5 and a second electrode connected to a sixth node P6. The eighth transistor M8 may include a control electrode that receives a third bias voltage VCM, a first electrode connected to the fifth node P5 and a second electrode that receives the first bias voltage VCMFB. In an embodiment, for example, a voltage level of the third bias voltage VCM may be about ½ a voltage level of the high power voltage VDD, but the invention is not limited thereto.

The ninth transistor M9 may include a control electrode that receives the third bias voltage VCM, a first electrode connected to a seventh node P7 and a second electrode that receives the first bias voltage VCMFB. The tenth transistor M10 may include a control electrode that receives the second output terminal voltage VO+ and a first electrode connected to the seventh node P7 and a second electrode connected to the sixth node P6.

The eleventh transistor M11 may include a control electrode connected to the sixth node P6, a first electrode connected to the sixth node P6 and a second electrode that receives the low power voltage VSS. The twelfth transistor M12 may include a control electrode connected to the sixth node P6, a first electrode that receives the bias voltage VCMFB and a second electrode that receives the low power voltage VSS. The thirteenth transistor M13 may include a control electrode that receives the second bias voltage VBP, a first electrode that receives the high voltage VDD and a second electrode connected to the fifth node P5. The fourteenth transistor M14 may include a control electrode that receives the second bias voltage VBP, a first electrode that receives the high power voltage VDD and a second electrode connected to the seventh node P7. In an embodiment, for example, the second bias voltage VBP may have an activation level such that the fourteenth transistor M14 is turned on.

The first capacitor C1 may include a first electrode that receives the first output terminal voltage VO− and a second electrode that receives the first bias voltage VCMFB. The second capacitor C2 may include a first electrode that receives the second output terminal voltage VO+ and a second electrode that receives the first bias voltage VCMFB. In such an embodiment, a stability of the first output terminal voltage VO− and the second output terminal voltage VO+ may be improved through the first capacitor C1 and the second capacitor C2.

In an embodiment, as shown in FIG. 16, the third transistor M3, the fourth transistor M4, the sixth transistor M6, the seventh transistor M7, the eighth transistor M8, the ninth transistor M9, the tenth transistor M10, the thirteenth transistor M13 and the fourteenth transistor M14 may be P-type transistors and the first transistor M1, the second transistor M2, the fifth transistor M5, the eleventh transistor M11 and the twelfth transistor M12 may be N-type transistors, but the invention is not limited thereto. Additionally, the configuration of the integrating amplifier CAMP and the configuration of the amplifying amp AAMP of embodiments of the invention is not limited to those described above.

In an embodiment, through the integrating amplifier CAMP and the amplifying amp AAMP, a reliability and a stability of the first output terminal voltage VO− and the second output terminal voltage VO+ may be improved. In such an embodiment, a noise of the first output terminal voltage VO− and the second output terminal voltage VO+ may be reduced.

Figure 17:
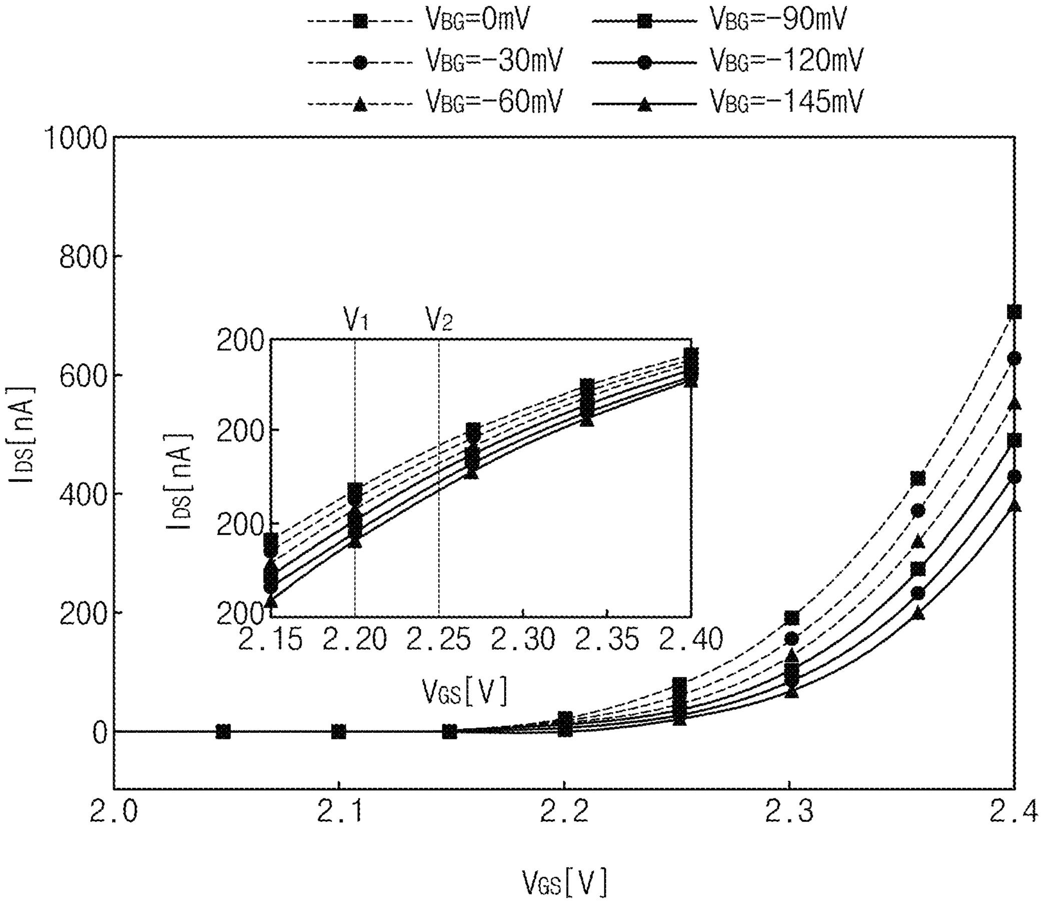
FIG. 17 is a graph illustrating voltage-current curve functions of a reference driving transistor of FIG. 1.
Figure 18:
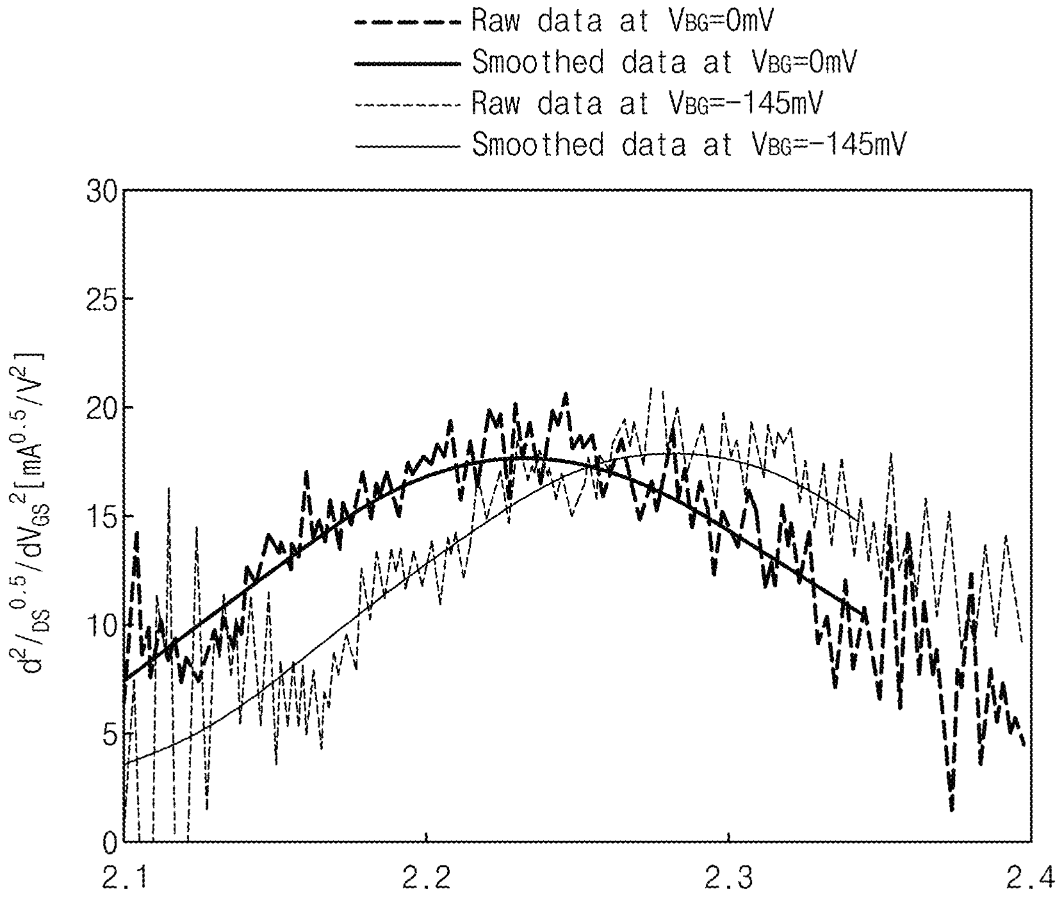
FIG. 18 is a graph illustrating a result of a first equation of FIG. 4.

FIG. 17 is a graph illustrating voltage-current curve functions of a reference driving transistor TDRR of FIG. 1. FIG. 18 is a graph illustrating a result of a first equation of FIG. 4.

Figure 19:
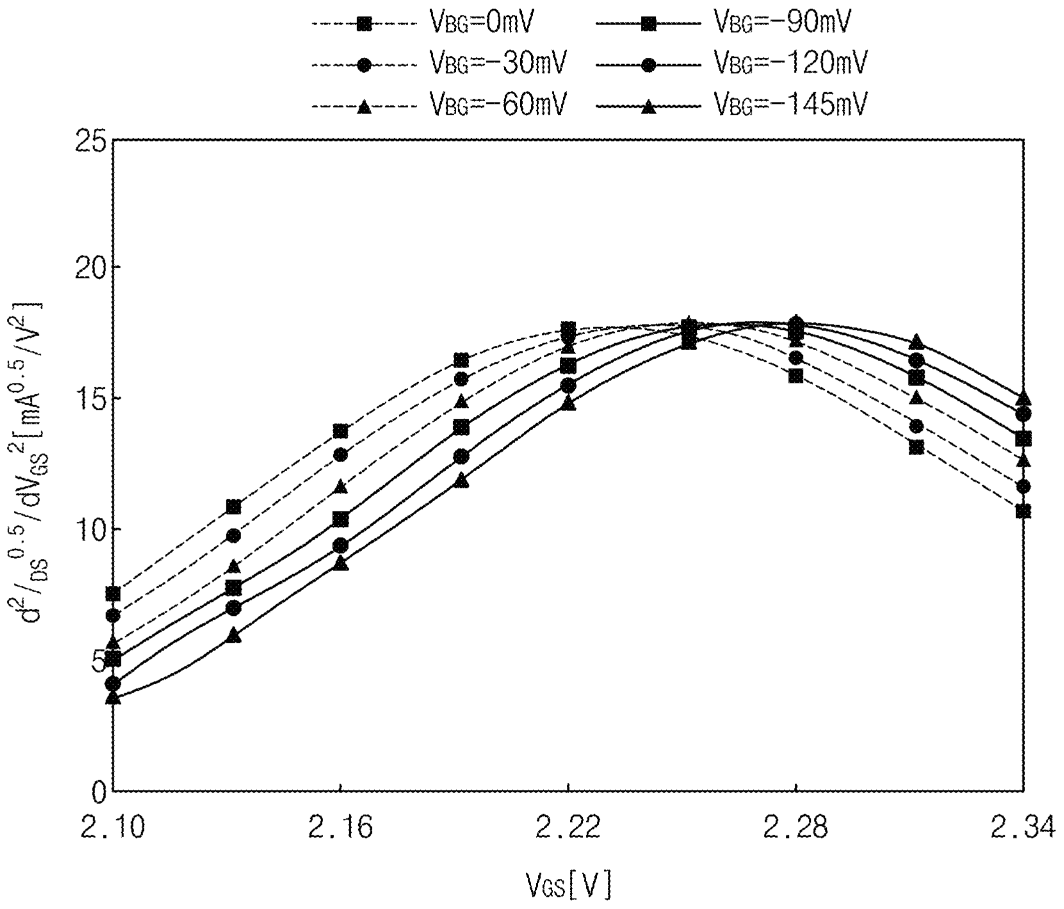
FIG. 19 is a graph of result of using a first equation for the voltage-current curve functions of the reference driving transistor.
Figure 20:
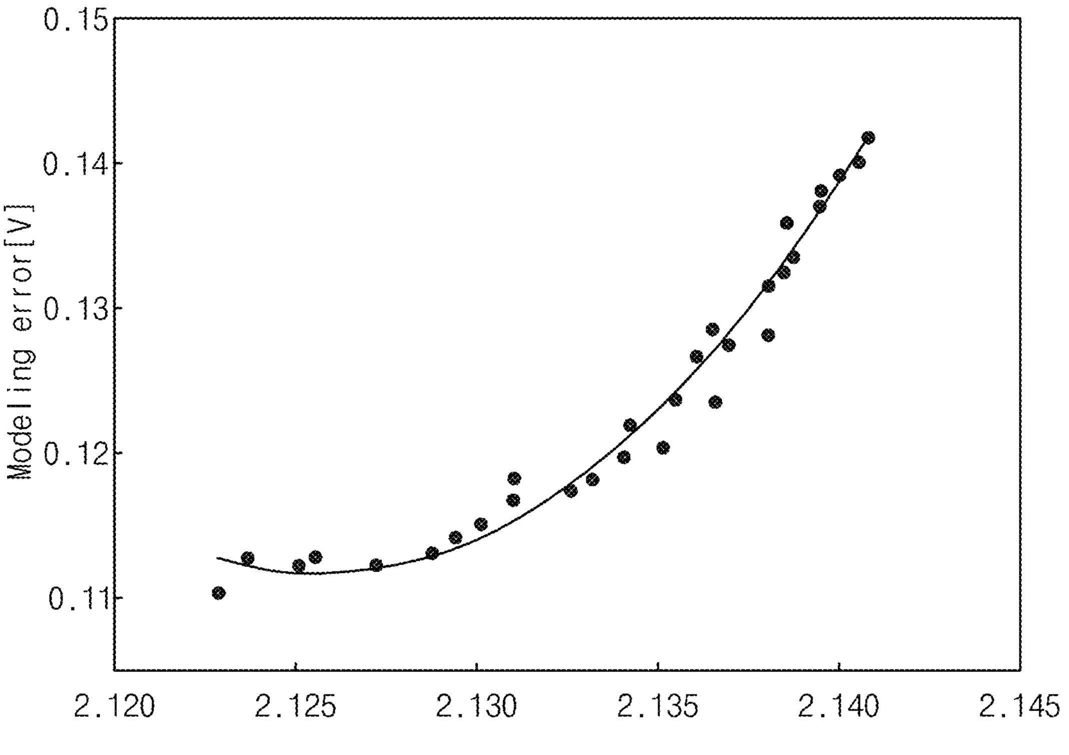
FIG. 20 is a graph of an example of an error function of display device of FIG. 1.

FIG. 19 is a graph of result of using a first equation for the voltage-current curve functions of the reference driving transistor TDRR. FIG. 20 is a graph of an example of an error function ERRF of display device of FIG. 1.

Referring to FIG. 1, FIG. 4, and FIG. 17 to FIG. 20, VBG shown in FIG. 17 may denote the gate voltage VCAL. In an embodiment, for example, the gate voltage VCAL may be changed about six times. For example, the first gate voltage may be about zero (0) millivolt (mV). For example, the second gate voltage may be about −30 mV. For example, the third gate voltage may be about −60 mV. For example, the fourth gate voltage may be about −90 mV For example, the fifth gate voltage may be about −120 mV For example, the sixth gate voltage may be about −145 mV. For example, a first voltage-current curve function corresponding to the first gate voltage may be collected. For example, a second voltage-current curve function corresponding to the second gate voltage may be collected. For example, a third voltage-current curve function corresponding to the third gate voltage may be collected. For example, a fourth voltage-current curve function corresponding to the fourth gate voltage may be collected. For example, a fifth voltage-current curve function corresponding to the fifth gate voltage may be collected. For example, a sixth voltage-current curve function corresponding to the sixth gate voltage may be collected. A second graph shown in FIG. 18 may be a graph obtained by converting the voltage-current curve functions into log scale.

For example, as shown in FIG. 18, the first threshold voltage may be calculated by using the second process to the voltage-current curve function. In an embodiment, for example, for reducing a noise of the voltage-current function, a Savitsky-Golay polynomial filter may be used, but the invention is not limited thereto. As shown in FIG. 18, the first threshold voltage corresponding to the first voltage-current curve function may be about 2.2327V and the first threshold voltage corresponding to the sixth voltage-current curve function may be about 2.2826V.

In an embodiment, for example, as shown in FIG. 19, the first threshold voltages corresponding to the first to sixth gate voltages may be linearly shifted as the gate voltage VCAL decreases.

In an embodiment, for example, as shown in FIG. 20, the error function ERRF may be derived by using the error values which are the difference between the first threshold voltages and the second threshold voltages. In an embodiment, the error function ERRF may be derived by using the second threshold voltages and the error values. In an embodiment, for example, the error function ERRF may be derived by using a second-order polynomial method on the error values.

Accordingly, in an embodiment of the invention, an accuracy of the compensation voltage applied to the display panel 100 may be improved. In a conventional display device, the driving transistor may be driven in a subthreshold region to reduce power consumption. Accordingly, the sensing data of the conventional display device may be inaccurate and the accuracy of the compensation voltage may be reduced. In an embodiment of the invention, the display device may apply a more accurate compensation voltage to the display panel 100 by using the error function ERRF. Accordingly, a display quality of the display panel 100 may be further improved.

Figure 21:
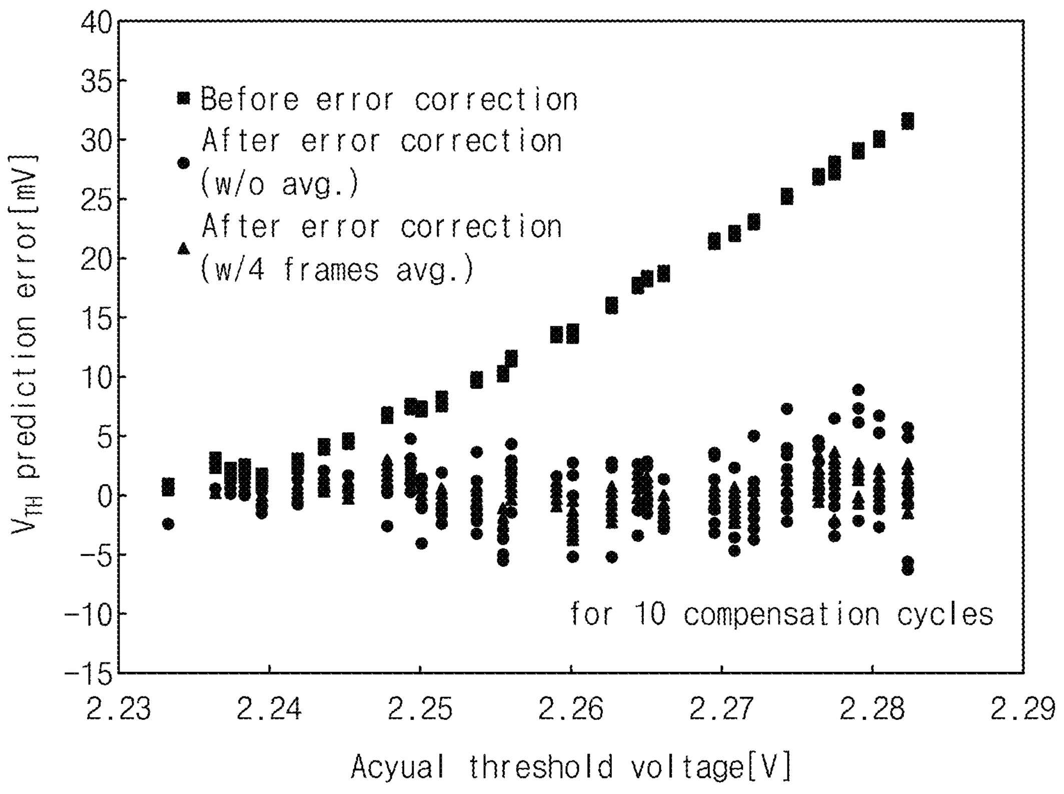
FIG. 21 is a graph illustrating a prediction error.

FIG. 21 is a graph illustrating a prediction error.

In the graph of FIG. 21, squares may represent the prediction error of the compensation voltage when the prediction function is not used. In the graph of FIG. 21, circles may represent the prediction error of the compensation voltage when the prediction function is used. In the graph of FIG. 21, triangles may represent the prediction error of the final compensation voltage. As shown in FIG. 21, in an embodiment, when the compensation voltage is generated by using the error function, the error is smaller than when the prediction function is not used. In such an embodiment, when the final compensation voltage is generated by using the prediction function, the error is further smaller than when the prediction function is not used. Accordingly, an accuracy of the compensation voltage or the final compensation voltage applied to the display panel may be further improved.

Figure 22:
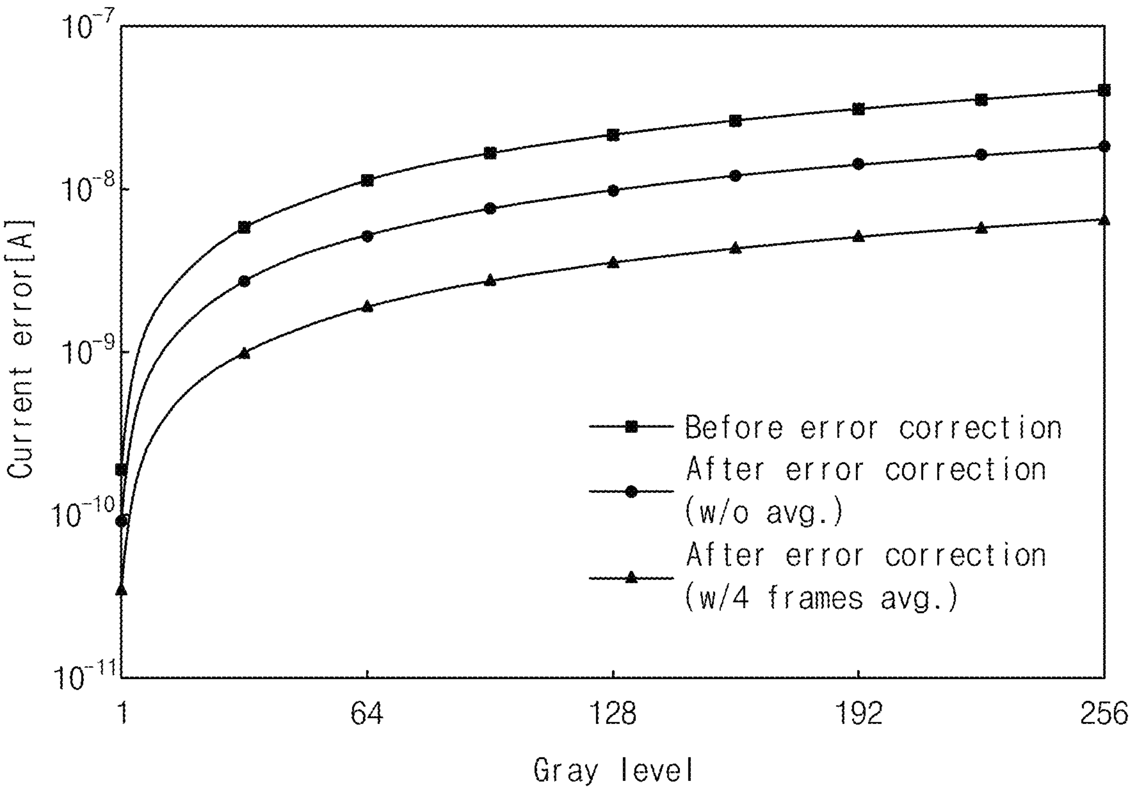
FIG. 22 is a graph illustrating a current error.

FIG. 22 is a graph illustrating a current error.

In the graph of FIG. 22, the squares may represent the current error according to the compensation voltage when the prediction function is not used. In the graph of FIG. 22, circles may represent current errors according to compensation voltage when the prediction function is used. In the graph of FIG. 22, triangles may represent current errors according to the final compensation voltage. As shown in FIG. 22, in an embodiment, when the compensation voltage is generated by using the error function, the current error is smaller than when the prediction function is not used. In such an embodiment, when the final compensation voltage is generated by using the prediction function, the current error is smaller than when the prediction function is not used. In an embodiment, for example, when comparing the current error at about 62 gray levels, when the prediction function is not used, the current error may be about 35.56 least significant bit (LSB). In such an embodiment, the current error corresponding to the compensation voltage by using the prediction function may be about 16.54 LSB, and the current error corresponding to the final compensation voltage by using the prediction function may be about 6.03 LSB. Accordingly, an accuracy of the compensation voltage or the final compensation voltage applied to the display panel may be further improved.

Figure 23:
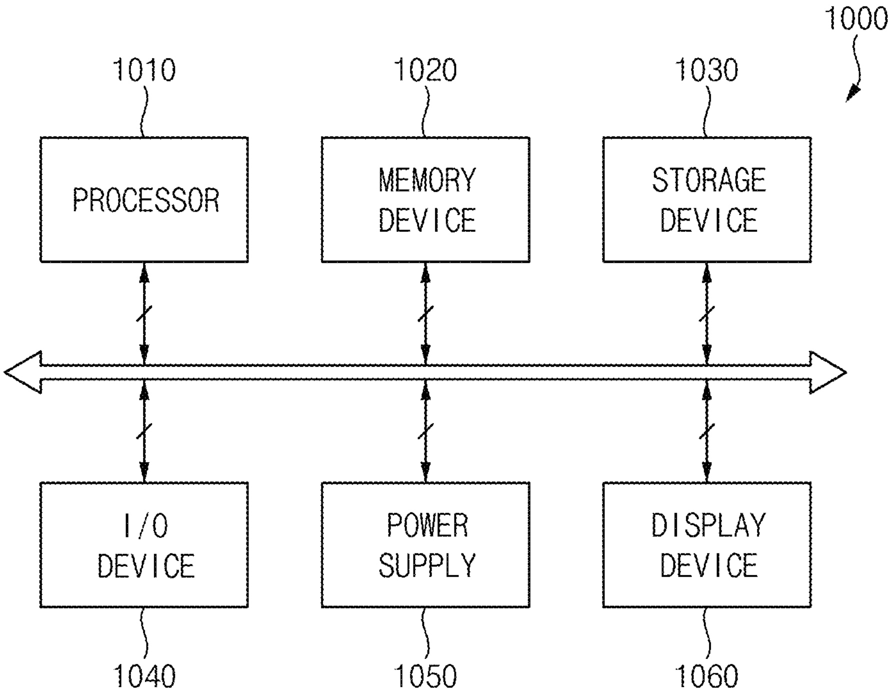
FIG. 23 is a block diagram illustrating an electronic device according to an embodiment of the invention.

FIG. 23 is a block diagram illustrating an electronic device 1000 according to an embodiment of the invention.

Referring to FIG. 23, an embodiment of the electronic device 1000 may include a processor 1010, a memory device 1020, a storage device 1030, an input/output (I/O) device 1040, a power supply 1050 and a display device 1060. In such an embodiment, the display device 1060 may be the display device of FIG. 1. In addition, the electronic device 1000 may further include a plurality of ports for communicating with a video card, a sound card, a memory card, a universal serial bus (USB) device, other electronic devices, etc.

The processor 1010 may perform various computing functions or various tasks. The processor 1010 may be a micro-processor, a central processing unit (CPU), an application processor (AP) or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device or the like and/or at least one volatile memory device such as a dynamic random access memory (DRAM) device, a static random access memory (SRAM) device, a mobile DRAM device or the like.

The storage device 1030 may include a solid state drive (SSD) device, a hard disk drive (HDD) device, a CD-ROM device or the like. The I/O device 1040 may include an input device such as a keyboard, a keypad, a mouse device, a touch-pad, a touch-screen or the like and an output device such as a printer, a speaker or the like. In an embodiment, the display device 1060 may be included in the I/O device 1040. The power supply 1050 may provide power for operations of the electronic device 1000. The display device 1060 may be coupled to other components via the buses or other communication links.

Figure 24:
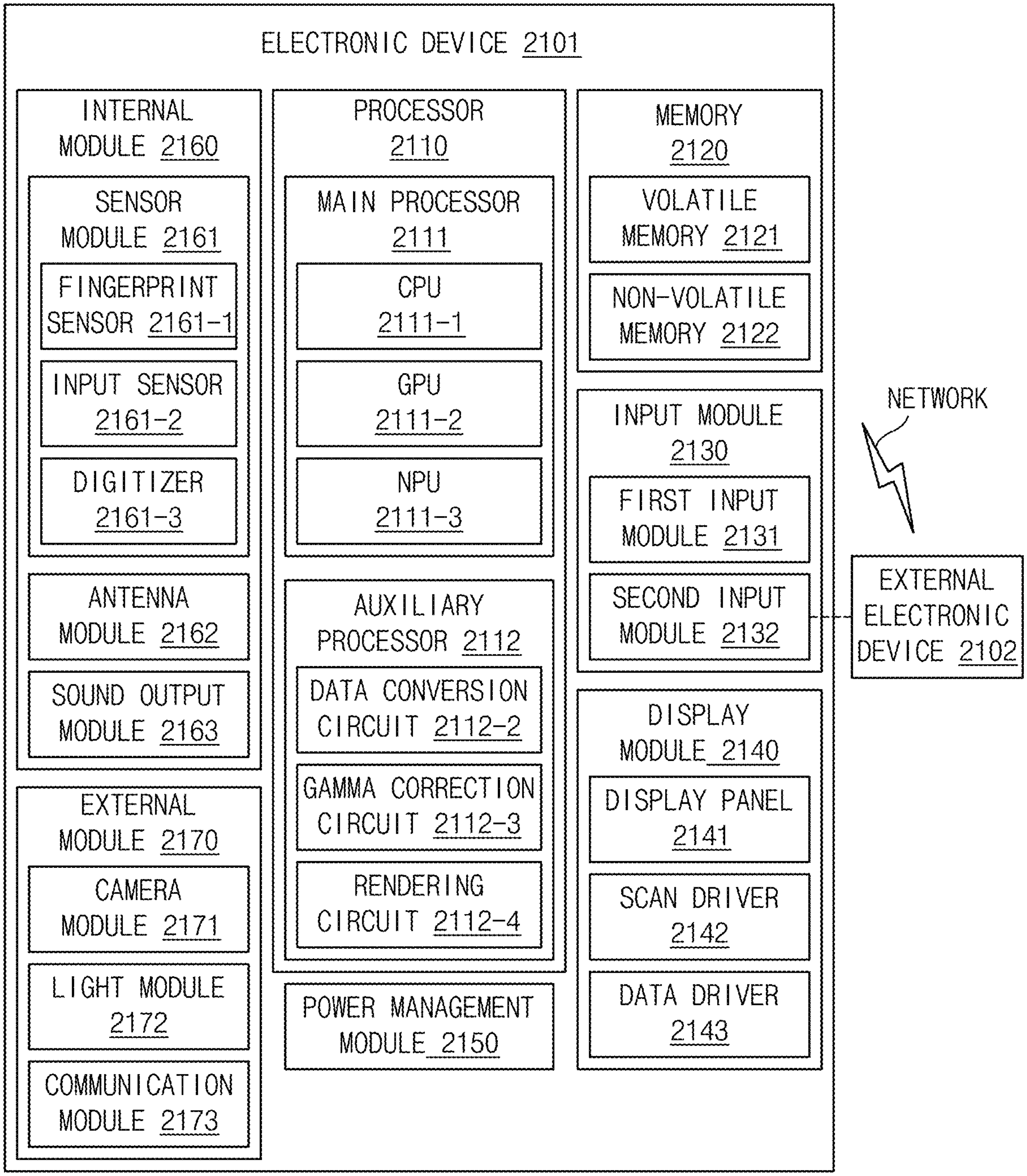
FIG. 24 is a block diagram illustrating an example of an electronic device of FIG. 23.

FIG. 24 is a block diagram illustrating an example of an electronic device of FIG. 23.

An embodiment of an electronic device 2101 may output various information via a display module 2140 in an operating system. When a processor 2110 executes an application stored in a memory 2120, the display module 2140 may provide application information to a user via a display panel 2141.

The processor 2110 may obtain an external input via an input module 2130 or a sensor module 2161 and may execute an application corresponding to the external input. In an embodiment, for example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

In an embodiment, for example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

In an embodiment, for example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In an embodiment, the electronic device 2101 may operate as described above. Hereinafter, a configuration of the electronic device 2101 will be described in detail. Some components of the electronic device 2101 described below may be integrated and provided as one component (or module) or one component may be provided separately as two or more components.

Referring to FIG. 24, an embodiment of the electronic device 2101 may communicate with an external electronic device 2102 via a network (e.g., a short-range wireless communication network or a long-range wireless communication network). In an embodiment, the electronic device 2101 may include the processor 2110, the memory 2120, the input module 2130, the display module 2140, a power management module 2150, an internal module 2160 and an external module 2170. In an embodiment, at least one of the components shown in FIG. 24 may be omitted from the electronic device 2101 or one or more other components may be added in the electronic device 2101. In an embodiment, some of the components (e.g., the sensor module 2161, an antenna module 2162 or the sound output module 2163) may be implemented as a single component (e.g., the display module 2140).

The processor 2110 may execute software to control at least one other component (e.g., a hardware or software component) of the electronic device 2101 coupled with the processor 2110 and may perform various data processing or computation. According to an embodiment, as at least part of the data processing or computation, the processor 2110 may store a command or data received from another component (e.g., the input module 2130, the sensor module 2161 or a communication module 2173) in volatile memory 2121, may process the command or the data stored in the volatile memory 2121 and may store resulting data in non-volatile memory 2122.

The processor 2110 may include a main processor 2111 and an auxiliary processor 2112. The main processor 2111 may include one or more of a central processing unit (CPU) 2111-1 or an application processor (AP). The main processor 2111 may further include any one or more of a graphics processing unit (GPU) 2111-2, a communication processor (CP) and an image signal processor (ISP). The main processor 2111 may further include a neural processing unit (NPU) 2111-3. The NPU 2111-3 may be a processor specialized in processing an artificial intelligence model and the artificial intelligence model may be generated through machine learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than a hardware structure. At least two of the above-described processing units and processors may be implemented as an integrated component (e.g., a single chip) or respective processing units and processors may be implemented as independent components (e.g., a plurality of chips).

The auxiliary processor 2112 may include a controller. The controller may include an interface conversion circuit and a timing control circuit. The controller may receive an image signal from the main processor 2111, may convert a data format of the image signal to meet interface specifications with the display module 2140 and may output image data. The controller may output various control signals required for driving the display module 2140.

The auxiliary processor 2112 may further include a data conversion circuit 2112-2, a gamma correction circuit 2112-3, a rendering circuit 2112-4 or the like. The data conversion circuit 2112-2 may receive image data from the controller. The data conversion circuit 2112-2 may compensate for the image data such that an image is displayed with a desired luminance according to characteristics of the electronic device 2101 or the user's setting or may convert the image data to reduce power consumption or to eliminate an after-image. The gamma correction circuit 2112-3 may convert image data or a gamma reference voltage so that an image displayed on the electronic device 2101 has desired gamma characteristics. The rendering circuit 2112-4 may receive image data from the controller and may render the image data in consideration of a pixel arrangement of the display panel 2141 in the electronic device 2101. At least one selected from the data conversion circuit 2112-2, the gamma correction circuit 2112-3 and the rendering circuit 2112-4 may be integrated in another component (e.g., the main processor 2111 or the controller). At least one selected from the data conversion circuit 2112-2, the gamma correction circuit 2112-3 and the rendering circuit 2112-4 may be integrated in a data driver 2143 described below.

The memory 2120 may store various data used by at least one component (e.g., the processor 2110 or the sensor module 2161) of the electronic device 2101. The various data may include, for example, input data or output data for a command related thereto. The memory 2120 may include at least one selected from the volatile memory 2121 and the non-volatile memory 2122.

The input module 2130 may receive a command or data to be used by the components (e.g., the processor 2110, the sensor module 2161 or the sound output module 2163) of the electronic device 2101 from the outside of the electronic device 2101 (e.g., the user or the external electronic device 2102).

The input module 2130 may include a first input module 2131 for receiving a command or data from the user and a second input module 2132 for receiving a command or data from the external electronic device 2102. The first input module 2131 may include a microphone, a mouse, a keyboard, a key (e.g., a button) or a pen (e.g., a passive pen or an active pen). The second input module 2132 may support a designated protocol capable of connecting the electronic device 2101 to the external electronic device 2102 by wire or wirelessly. In an embodiment, the second input module 2132 may include a high definition multimedia interface (HDMI), a universal serial bus (USB) interface, an SD card interface or an audio interface. The second input module 2132 may include a connector that may physically connect the electronic device 2101 to the external electronic device 2102. In an embodiment, for example, the second input module 2132 may include an HDMI connector, a USB connector, an SD card connector or an audio connector (e.g., a headphone connector).

The display module 2140 may visually provide information to the user. The display module 2140 may include the display panel 2141, a scan driver 2142 and the data driver 2143. The display module 2140 may further include a window, a chassis and a bracket for protecting the display panel 2141.

The display panel 2141 may include a liquid crystal display panel, an organic light emitting display panel or an inorganic light emitting display panel, but the type of the display panel 2141 is limited thereto. The display panel 2141 may be a rigid type display panel or a flexible type display panel capable of being rolled or folded. The display module 2140 may further include a supporter, a bracket or a heat dissipation member that supports the display panel 2141.

The scan driver 2142 may be mounted on the display panel 2141 as a driving chip. Alternatively, the scan driver 2142 may be integrated into the display panel 2141. In an embodiment, for example, the scan driver 2142 may include an amorphous silicon TFT gate driver circuit (ASG), a low temperature polycrystalline silicon (LTPS) TFT gate driver circuit or an oxide semiconductor TFT gate driver circuit (OSG) embedded in the display panel 2141. The scan driver 2142 may receive a control signal from the controller and may output scan signals to the display panel 2141 in response to the control signal.

The display panel 2141 may further include an emission driver. The emission driver may output an emission control signal to the display panel 2141 in response to a control signal received from the controller. The emission driver may be formed separately from the scan driver 2142 or may be integrated into the scan driver 2142.

The data driver 2143 may receive a control signal from the controller, may convert image data into analog voltages (e.g., data voltages) in response to the control signal and then may output the data voltages to the display panel 2141.

The data driver 2143 may be incorporated into other components (e.g., the controller). Further, the functions of the interface conversion circuit and the timing control circuit of the controller described above may be integrated into the data driver 2143.

The display module 2140 may further include the emission driver, a voltage generator circuit or the like. The voltage generator circuit may output various voltages used to drive the display panel 2141.

The power management module 2150 may supply power to the components of the electronic device 2101. The power management module 2150 may include a battery that charges a power supply voltage. The battery may include a primary cell which is not rechargeable, a secondary cell which is rechargeable or a fuel cell. The power management module 2150 may include a power management integrated circuit (PMIC). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131 and may generate an electrical signal or data value corresponding to the input. The sensor module 2161 may include at least one selected from the fingerprint sensor 2161-1, the input sensor 2161-2 and a digitizer 2161-3.

The fingerprint sensor 2161-1 may generate a data value corresponding to the user's fingerprint. The fingerprint sensor 2161-1 may be one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen or may transmit/receive data to/from the active pen.

The input sensor 2161-2 may measure a bio-signal, such as blood pressure, moisture or body fat. In an embodiment, for example, when a portion of the body of the user touches a sensor layer or a sensing panel and does not move for a certain period of time, the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen or may transmit/receive data to/from the active pen.

At least one selected from the fingerprint sensor 2161-1, the input sensor 2161-2 and the digitizer 2161-3 may be implemented as a sensor layer formed on the display panel 2141 through a continuous process. The fingerprint sensor 2161-1, the input sensor 2161-2 and the digitizer 2161-3 may be disposed above the display panel 2141 or at least one of the fingerprint sensor 2161-1, the input sensor 2161-2 and the digitizer 2161-3 may be disposed below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be disposed between the display panel 2141 and a window disposed above the display panel 2141. In an embodiment, the sensing panel may be disposed on the window, but the location of the sensing panel is not limited thereto.

At least one selected from the fingerprint sensor 2161-1, the input sensor 2161-2 and the digitizer 2161-3 may be embedded in the display panel 2141. In other words, at least one selected from the fingerprint sensor 2161-1, the input sensor 2161-2 and the digitizer 2161-2 may be simultaneously formed through a process of forming elements (e.g., light emitting elements, transistors, etc.) included in the display panel 2141.

In addition, the sensor module 2161 may generate an electrical signal or a data value corresponding to an internal state or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The antenna module 2162 may include one or more antennas for transmitting or receiving a signal or power to or from the outside. In an embodiment, the communication module 2173 may transmit or receive a signal to or from the external electronic device 2102 through an antenna suitable for a communication method. An antenna pattern of the antenna module 2162 may be integrated into one component (e.g., the display panel 2141) of the display module 2140 or the input sensor 2161-2.

The sound output module 2163 may output sound signals to the outside of the electronic device 2101. The sound output module 2163 may include, for example, a speaker or a receiver. The speaker may be used for general purposes, such as playing multimedia or playing record. The receiver may be used for receiving incoming calls. In an embodiment, the receiver may be implemented as separate from or as part of the speaker. A sound output pattern of the sound output module 2163 may be integrated into the display module 2140.

The camera module 2171 may capture a still image and a moving image. In an embodiment, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light emitting diode or a xenon lamp. The light module 2172 may operate in conjunction with the camera module 2171 or may operate independently of the camera module 2171.

The communication module 2173 may support establishing a wired or wireless communication channel between the electronic device 2101 and the external electronic device 2102 and performing communication via the established communication channel. The communication module 2173 may include a wireless communication module (e.g., a cellular communication module, a short-range wireless communication module or a global navigation satellite system (GNSS) communication module) or a wired communication module (e.g., a local area network (LAN) communication module or a power line communication (PLC) module). The communication module 2173 may communicate with the external electronic device 2102 via a short-range communication network (e.g., Bluetooth™, wireless-fidelity (Wi-Fi) direct or infrared data association (IrDA)) or a long-range communication network (e.g., a cellular network, the Internet or a computer network (e.g., LAN or wide area network (WAN)). These various types of communication modules 2173 may be implemented as a single chip or may be implemented as multi-chips separate from each other.

The input module 2130, the sensor module 2161, the camera module 2171 or the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. In an embodiment, for example, the processor 2110 may generate image data corresponding to input data applied through a mouse or an active pen and may output the image data to the display module 2140. Alternatively, the processor 2110 may generate command data corresponding to the input data and may output the command data to the camera module 2171 or the light module 2172. When no input data is received from the input module 2130 for a certain period of time, the processor 2110 may switch an operation mode of the electronic device 2101 to a low power mode or a sleep mode, thereby reducing power consumption of the electronic device 2101.

The processor 2110 may output a command or data to the display module 2140, the sound output module 2163, the camera module 2171 or the light module 2172 based on sensing data received from the sensor module 2161. In an embodiment, for example, the processor 2110 may compare authentication data applied by the fingerprint sensor 2161-1 with authentication data stored in the memory 2120 and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161 and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 or the gamma correction circuit 2112-3 may perform the luminance correction on the image data and the processor 2110 may provide the luminance-corrected image data to the display module 2140.

At least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI) or ultra-path interconnect (UPI)). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic device 2101 according to various embodiments described above may be various types of devices. In an embodiment, for example, the electronic device 2101 may be a portable communication device (e.g., a smart phone), a computer device, a portable multimedia device, a portable medical device, a camera, a wearable device or a home appliance. However, the electronic device 2101 according to embodiments is not limited to the above-described devices.

In the display device and the method of driving the display device according to embodiments of the invention, a reliability of the compensation voltage of active pixels may be improved by generating the error function from the reference pixel.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including an active pixel and a reference pixel;

a reference pixel measurer which applies a reference data voltage and a gate voltage to the reference pixel, calculates a first threshold voltage and a second threshold voltage based on a driving current of the reference pixel corresponding to the reference data voltage and calculates a difference between the first threshold voltage and the second threshold voltage; and a driving controller which controls the reference pixel measurer and outputs a data signal based on the difference between the first threshold voltage and the second threshold voltage, wherein the reference pixel comprises a reference driving transistor including a first control electrode which receives the reference data voltage, a second control electrode which receives the gate voltage, a first electrode which receive a first power voltage and a second electrode connected to a reference node, and wherein the active pixel comprises:

an active driving transistor including a first control electrode connected to a first active node, a first electrode which receives the first power voltage and a second electrode connected to a second active node;

an active scan transistor including a control electrode which receives a scan gate signal, a first electrode which receives a data voltage generated based on the data signal and a second electrode connected to the first active node;

an active sensing transistor including a control electrode which receives a sensing gate signal, a first electrode connected to a sensing line and a second electrode connected to the second active node; and a light emitting element including an anode connected to the second active node and a cathode which receives a second power voltage.

2. The display device of claim 1, wherein the gate voltage is varied.

3. The display device of claim 2, wherein the gate voltage includes first to K-th gate voltages, wherein K is a positive integer, wherein the reference data voltage includes a first reference data voltage to a second reference data voltage, and wherein the reference pixel measurer calculates a voltage-current curve function by applying the first reference data voltage to the second reference data voltage to the first control electrode of the reference driving transistor, calculates an error value based on the voltage-current curve function, calculates first to K-th error values corresponding to the first to K-th gate voltages, respectively, and generates an error function based on the first to K-th error values.

4. The display device of claim 3, wherein the error value is a value obtained by subtracting the second threshold voltage calculated by applying a second equation to the voltage-current curve function from the first threshold voltage calculated by applying a first equation to the voltage-current curve function.

5. The display device of claim 4, wherein the first threshold voltage is calculated by using the first equation, wherein the first equation is $$VTH = \max\left\{\frac{d}{dVGS}\left(\frac{d}{dVGS}f^{0.5}(VGS)\right)\right\},$$

wherein

VTH denotes the first threshold voltage, $f^{0.5}(VGS)$ denotes a 0.5 square curve function obtained by multiplying the voltage-current curve function to the power of 0.5, and $$\max\left\{\frac{d}{dVGS}\left(\frac{d}{dVGS}f^{0.5}(VGS)\right)\right\}$$

corresponds to a maximum value of values obtained by second differentiation of the 0.5 square curve function.

6. The display device of claim 4, wherein the second threshold voltage is calculated by using the second equation, wherein the second equation is $$\text{VTH\_CAL} = \frac{\sqrt{I2} * VGS1 - \sqrt{I1} * VGS2}{\sqrt{I2} - \sqrt{I1}},$$

wherein

VTH_CAL denotes the second threshold voltage,

VGS1 denotes a voltage difference between the first control electrode and the second electrode of the reference driving transistor when a first sensing data voltage between the first reference data voltage to the second reference data voltage is applied to the first control electrode of the reference driving transistor, VGS2 denotes a voltage difference between the first control electrode and the second electrode of the reference driving transistor when a second sensing data voltage between the first reference data voltage to the second reference data voltage is applied to the first control electrode of the reference driving transistor, I1 denotes a first driving current corresponding to the first sensing data voltage, and I2 denotes a second driving current corresponding to the second sensing data voltage.

7. The display device of claim 3, wherein the driving controller receives the error function, stores the error function and outputs the data signal based on the error function.

8. The display device of claim 7, further comprising:

a data driver which applies the data voltage to the active pixels in an active period; and a sensing driver which receives a sensing current from at least one pixel of the active pixels in a blank period and outputs a sensing data including a sensing threshold voltage, wherein the driving controller controls the data driver and the sensing driver, wherein the driving controller includes a compensation voltage calculator and a data signal outputter, and wherein the compensation voltage calculator receives the sensing data, calculates an active threshold voltage based on the sensing threshold voltage, calculates a compensation voltage based on the active threshold voltage and the error function and outputs the data signal based on the compensation voltage.

9. The display device of claim 8, wherein the active threshold voltage is calculated by using a third equation, wherein the third equation is $$\text{PXA\_VTH\_CAL} = \frac{\sqrt{VSEN2} * VGS1A - \sqrt{VSEN1} * VGS2A}{\sqrt{VSEN2} - \sqrt{VSEN1}},$$

wherein

PXA_VTH_CAL denotes the active threshold voltage,

VGS1A denotes a voltage difference between the first control electrode and the second electrode of the active driving transistor of the least one pixel when a first active sensing data voltage included in the data voltage is applied to the first control electrode of the active driving transistor, VGS2A denotes a voltage difference between the first control electrode and the second electrode of the active driving transistor of the least one pixel when a second active sensing data voltage included in the data voltage is applied to the first control electrode of the active driving transistor, VSEN1 denotes a first sensing threshold voltage corresponding to the first active sensing data voltage, and VSEN2 denotes a second sensing threshold voltage corresponding to the second active sensing data voltage.

10. The display device of claim 8, wherein the display panel further comprises first to fourth sensing lines, wherein the sensing driver includes an odd numbered sensing circuit and an even numbered sensing circuit, wherein the odd numbered sensing circuit is connected to the first sensing line and the third sensing line, and wherein the even numbered sensing circuit is connected to the second sensing line and the fourth sensing line.

11. The display device of claim 8, wherein the compensation voltage is an average value of a first compensation voltage calculated in a first frame and a second compensation voltage calculated in a second frame.

12. The display device of claim 3, wherein the error function includes a red error function corresponding to a red reference light emitting element, a green error function corresponding to a green reference light emitting element and a blue error function corresponding to a blue reference light emitting element.

13. The display device of claim 3, wherein the error function is generated in a manufacturing process.

14. A method of driving a display device, the method comprising:

storing a first sensing threshold voltage outputted by applying a first sensing data voltage to a first control electrode of an active driving transistor included in an active pixel of a display panel of the display device;

after the storing the first sensing threshold voltage, storing a second sensing threshold voltage outputted by applying a second sensing data voltage to the first control electrode of the active driving transistor;

calculating an active threshold voltage based on the first sensing threshold voltage and the second sensing threshold voltage; and after the calculating the active threshold voltage, outputting a compensation voltage calculated by using the active threshold voltage and an error value, which is a difference between a first threshold voltage and a second threshold voltage obtained from a reference pixel of the display panel of the display device.

15. The method of claim 14, further comprising: calculating the error value comprising:

applying a first reference data voltage to a second reference data voltage to a first control electrode of a reference driving transistor of the reference pixel and applying a gate voltage to a second control electrode of the reference driving transistor;

after the applying the first reference data voltage to the second reference data voltage and the gate voltage, calculating a voltage-current curve function of the reference driving transistor;

after the calculating the voltage-current curve function, calculating the first threshold voltage and the second threshold voltage based on the voltage-current curve function;

after the calculating the first threshold voltage and the second threshold voltage, storing the error value obtained by subtracting the second threshold voltage from the first threshold voltage; and after the storing the error value, calculating a first error value to a K-th error value by varying the gate voltage K times, wherein K is a positive integer.

16. The method of claim 15, further comprising:

generating an error function based on the first error value to the K-th error value.

17. The method of claim 15, wherein the first threshold voltage is calculated by using a first equation, wherein the first equation is $$VTH = \max\left\{\frac{d}{dVGS}\left(\frac{d}{dVGS}f^{0.5}(VGS)\right)\right\},$$

wherein

VTH denotes the first threshold voltage, $f^{0.5}$=(VGS) denotes a 0.5 square curve function obtained by multiplying the voltage-current curve function to the power of 0.5, and $$\max\left\{\frac{d}{dVGS}\left(\frac{d}{dVGS}f^{0.5}(VGS)\right)\right\}$$

corresponds to a maximum value of values obtained by second differentiation of the 0.5 square curve function.

18. The method of claim 15, wherein the second threshold voltage is calculated by using a second equation, wherein the second equation is $$\text{VTH\_CAL} = \frac{\sqrt{I2} * VGS1 - \sqrt{I1} * VGS2}{\sqrt{I2} - \sqrt{I1}},$$

wherein

VTH_CAL denotes the second threshold voltage,

VGS1 denotes a voltage difference between the first control electrode and a source electrode of the reference driving transistor when a first sensing data voltage between the first reference data voltage to the second reference data voltage is applied to the first control electrode of the reference driving transistor, VGS2 denotes a voltage difference between the first control electrode and the source electrode of the reference driving transistor when a second sensing data voltage between the first reference data voltage to the second reference data voltage is applied to the first control electrode of the reference driving transistor, I1 denotes a first driving current corresponding to the first sensing data voltage, and I2 denotes a second driving current corresponding to the second sensing data voltage.

19. The method of claim 14, wherein the active threshold voltage is calculated by using a third equation, wherein the third equation is $$\text{PXA\_VTH\_CAL} = \frac{\sqrt{VSEN2} * VGS1A - \sqrt{VSEN1} * VGS2A}{\sqrt{VSEN2} - \sqrt{VSEN1}},$$

wherein

PXA_VTH_CAL denotes the active threshold voltage,

VGS1A denotes a voltage difference between the first control electrode and a source electrode of the active driving transistor of the active pixel when a first active sensing data voltage included in the data voltage is applied to the first control electrode of the active driving transistor, VGS2A denotes a voltage difference between the first control electrode and the source electrode of the active driving transistor of the active pixel when a second active sensing data voltage included in the data voltage is applied to the first control electrode of the active driving transistor, VSEN1 denotes a first sensing threshold voltage corresponding to the first active sensing data voltage, and VSEN2 denotes a second sensing threshold voltage corresponding to the second active sensing data voltage.

20. The method of claim 14, wherein the compensation voltage is an average value of a first compensation voltage calculated in a first frame and a second compensation voltage calculated in a second frame.

21. A display device comprising:

a display panel; and a display panel driver which drives the display panel, wherein the display panel driver applies a compensation voltage to the display panel by using a sensing data and an error function, wherein the display panel emits light based on the compensation voltage, and wherein the error function is set based on first threshold voltages calculated by applying a second process to voltage-current curve functions obtained by using a first process and second threshold voltages calculated by applying a third process different from the second process to the voltage-current curve functions.

22. The display device of claim 21, wherein the error function is set based on an error value which is a difference between the first threshold voltage and the second threshold voltage.

23. The display device of claim 21, wherein in the blank period, the compensation voltage is applied to the display panel by using the sensing data and the error function.

* * * * *